(12) United States Patent
Ly et al.

(10) Patent No.: US 10,795,947 B2
(45) Date of Patent: Oct. 6, 2020

(54) UNIFIED MESSAGE SEARCH

(71) Applicant: Google Inc., Mountain View, CA (US)

(72) Inventors: Vinh Quoc Ly, Millbrae, CA (US);
Ahmet Onur Tekdas, Santa Clara, CA (US); Timo Mertens, Millbrae, CA (US); Okan Kolak, Sunnyvale, CA (US); Charles Randell Sievert, San Jose, CA (US); Christine Nguyen, Santa Clara, CA (US); Jin Lu, Redwood City, CA (US)

(73) Assignee: GOOGLE LLC, Mountain View, CA (US)

( * ) Notice: Subject to any disclaimer, the term of this patent is extended or adjusted under 35 U.S.C. 154(b) by 856 days.

(21) Appl. No.: 15/156,567

(22) Filed: May 17, 2016

(65) Prior Publication Data
US 2017/0337274 A1    Nov. 23, 2017

(51) Int. Cl.
*G06F 16/00* (2019.01)
*G06F 16/951* (2019.01)
(Continued)

(52) U.S. Cl.
CPC .......... *G06F 16/951* (2019.01); *G06F 16/904* (2019.01); *G06Q 10/00* (2013.01);
(Continued)

(58) Field of Classification Search
CPC ......... G06F 17/30864; G06F 17/30994; G06F 16/951; G06F 16/904; H04W 4/14
See application file for complete search history.

(56) References Cited

U.S. PATENT DOCUMENTS 6,044,260 A * 3/2000 Eaton ...................... H04L 51/14
340/5.42
7,296,241 B2   11/2007 Oshiro et al.
(Continued)

FOREIGN PATENT DOCUMENTS

EP    1647906    4/2006

OTHER PUBLICATIONS

International Search Report and Written Opinion in International Application No. PCT/US2016/069379, dated Mar. 20, 2017, 13 pages.
(Continued)

*Primary Examiner* — Jean M Corrielus
(74) *Attorney, Agent, or Firm* — Middleton Reutlinger

(57) ABSTRACT

The disclosed embodiments include computerized methods, systems, and devices, including computer programs encoded on a computer storage medium, for generating terms of a search query based on a user's spoken utterances, identifying multiple cross-platform messages based on the generated terms, and to generating, via a presentation device, a single interface that enables the user to interact with identified messages. Based on a spoken utterance, the disclosed embodiments may determine user-specified search terms and/or criteria, and based on the user-specified search terms and/or criteria, may obtain cross-platform message data that corresponds to the search query. The communications device may generate one or more interface elements that describe corresponding ones of the cross-platform messages, which may be presented within a unified graphical user interface or voice-user interface by a communications device.

23 Claims, 10 Drawing Sheets

(51) Int. Cl.
*G06F 16/904* (2019.01)
*G06Q 10/10* (2012.01)
*G06Q 10/00* (2012.01)
*H04M 1/27* (2006.01)
*H04M 1/725* (2006.01)
*H04W 4/14* (2009.01)

(52) U.S. Cl.
CPC .......... *G06Q 10/107* (2013.01); *H04M 1/271* (2013.01); *H04M 1/72547* (2013.01); *H04W 4/14* (2013.01); *H04M 2250/74* (2013.01)

(56) References Cited

U.S. PATENT DOCUMENTS

| | | | | |
|---|---|---|---|---|
| 7,460,874 | B1 * | 12/2008 | Hou | H04W 24/00 370/229 |
| 8,239,461 | B2 | 8/2012 | Jones et al. | |
| 8,566,403 | B2 * | 10/2013 | Pascal | H04L 51/04 709/206 |
| 9,838,542 | B1 * | 12/2017 | Kirchhoff | H04M 1/7255 |
| 2004/0025663 | A1 * | 2/2004 | Harada | G10D 13/024 84/104 |
| 2005/0076109 | A1 * | 4/2005 | Mathew | G06Q 10/06 709/223 |
| 2005/0108341 | A1 * | 5/2005 | Mathew | G06Q 10/06 709/206 |
| 2005/0114456 | A1 * | 5/2005 | Mathew | G06Q 10/06 709/206 |
| 2005/0114462 | A1 * | 5/2005 | Mathew | G06Q 10/06 709/207 |
| 2005/0172033 | A1 * | 8/2005 | Mathew | G06Q 10/06 709/246 |
| 2006/0031340 | A1 * | 2/2006 | Mathew | G06Q 10/107 709/206 |
| 2007/0011258 | A1 | 1/2007 | Khoo | |
| 2007/0174388 | A1 | 7/2007 | Williams | |
| 2008/0239955 | A1 * | 10/2008 | Chang | H04L 47/10 370/232 |
| 2009/0106366 | A1 | 4/2009 | Virtanen et al. | |
| 2009/0209286 | A1 | 8/2009 | Bentley et al. | |
| 2010/0159883 | A1 * | 6/2010 | Pascal | H04L 51/04 455/412.1 |
| 2011/0053565 | A1 | 3/2011 | Johansson et al. | |
| 2011/0078247 | A1 | 3/2011 | Jackson et al. | |
| 2011/0209196 | A1 | 8/2011 | Kennedy | |
| 2013/0238651 | A1 | 9/2013 | Benedek et al. | |
| 2014/0067401 | A1 * | 3/2014 | Sanjeeva | G10L 13/00 704/260 |
| 2014/0164507 | A1 * | 6/2014 | Tesch | H04L 51/10 709/204 |
| 2015/0057997 | A1 | 2/2015 | Quast et al. | |
| 2015/0186538 | A1 | 6/2015 | Yan et al. | |
| 2015/0193457 | A1 | 7/2015 | Radhakrishnan | |
| 2015/0312193 | A1 * | 10/2015 | Menna | G06Q 10/107 705/26.3 |
| 2016/0034977 | A1 * | 2/2016 | Bhaowal | G06F 16/951 707/722 |
| 2017/0286429 | A1 * | 10/2017 | Lange | H04L 67/22 |
| 2019/0155871 | A1 * | 5/2019 | Lane | H04L 51/02 |

OTHER PUBLICATIONS

"How to Use Spotlight Search on Your iPhone or iPad," How-To Geek, publically available before May 17, 2016 [retrieved on May 20, 2016]. Retrieved from the Internet: URL<http://www.howtogeek.com/229060/how-to-use-spotlight-search-on-your-iphone-or-ipad/>, 4 pages.

El Khoury, "PSA: Google Now Can Read Your Last Five Text Messages Like An Answering Machine And Let You Reply To Them," Android Police, Dec. 2, 2015 [retrieved on May 20, 2016]. Retrieved from the Internet: URL<http://www.androidpolice.com/2015/12/02/psa-google-now-can-read-your-last-five-text-messages-like-an-answering-machine-and-let-you-reply-to-them/>, 5 pages.

Miera, "The ultimate guide to Google Now cards," Android Central, Sep. 5, 2014 [retrieved on May 20, 2016]. Retrieved from the Internet: URL<http://www.androidcentral.com/ultimate-guide-google-now-cards>, 38 pages.

Rittmeyer, "Android Tutorial: Adding Search to Your Apps," Grokking Android, Jul. 6, 2012 [retrieved on May 20, 2016]. Retrieved from the Internet: URL <http://www.grokkingandroid.com/android-tutorial-adding-search-to-your-apps/>, 15 pages.

International Preliminary Report on Patentability issued in International Application No. PCT/US2016/069379, dated Nov. 29, 2018, 7 pages.

European Patent Office; Examination Report issued in Application No. EP16828893.4; 7 pages; dated Aug. 7, 2020.

* cited by examiner

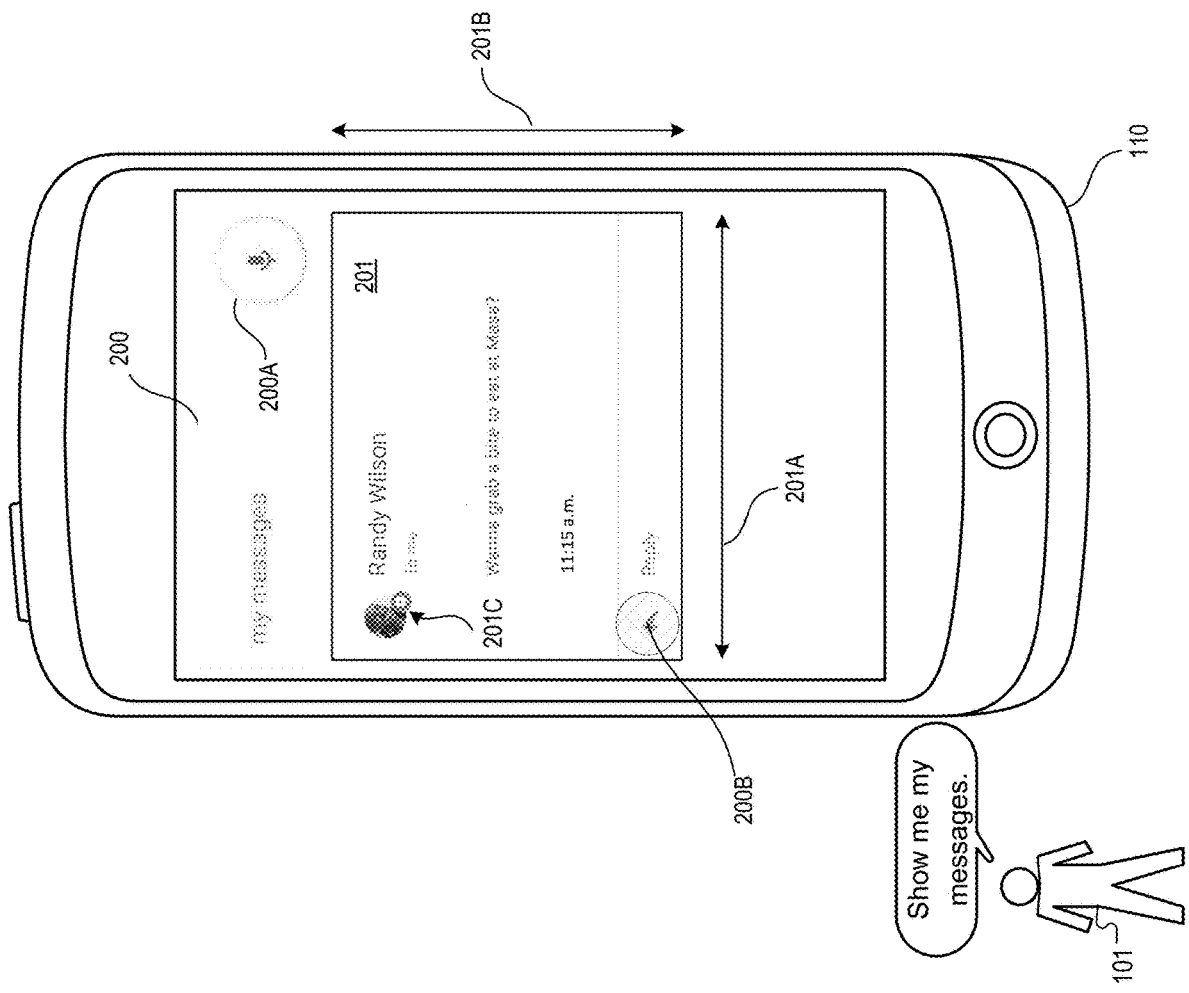

UNIFIED MESSAGE SEARCH

FIELD

This specification describes technologies related to search engines.

BACKGROUND

Now, more than ever, communication represents a core aspect of our daily lives, as much of our professional and private communication occurs via messages exchanged in written form through various communications platforms, such as email, text message, and chat messages. Although many smart phones and tablet computers include virtual assistants that may be capable of facilitating simple searches, these virtual assistants are often incapable of searching for messages generated across various communications platforms using a single search query.

SUMMARY

The disclosed embodiments relate to computerized processes that enable a communications device, such as a mobile telephone, smart phone, or tablet computer, to generate terms of a search query, to identify multiple messages across multiple messaging platforms based on the search terms, and to present a single interface that enables the user to interact with the identified messages generated by multiple messaging platforms. Below, the term "cross-platform messages" refers to a set of messages that includes a message from each of multiple different messaging platforms or messaging services.

For example, the communications device may receive a search query based on one or more utterances spoken by the user and captured by a microphone. The communications device may apply various speech-recognition algorithms to the captured audio data and generate corresponding textual output data, which may include user-specified search terms. The specified search terms may include, but are not limited to, a request to identify cross-platform messages associated with a particular sender and/or receiver, a particular messaging platform, a presence of words or phrases within corresponding message subjects or message bodies, and/or a particular range of transmission and/or receipt dates. In other instances, the search query may be open-ended and, for example, may request access to all cross-platform messages transmitted from or received by the communications device.

The communications device may access one or more repositories of stored cross-platform message data, and based on the user-specified search terms, may obtain at least a portion of the stored cross-platform message data that corresponds to the search query. The communications device may generate one or more interface elements that describe cross-platform messages within the obtained cross-platform message data (e.g., message cards), and additionally or alternatively, summarize groups of the cross-platform messages generated by corresponding ones of the messaging platforms (e.g., digest cards). The communications device may also generate a unified interface that includes the interface elements, which include, but are not limited to, the message cards and/or digest cards. The communications device may process the generated data and render the unified interface, and the constituent interface elements, for presentation to the user through a corresponding presentation device, such as a touchscreen display of the communication device.

In an embodiment, a computer-implemented method includes receiving, by one or more processors, a query at a communications device, and obtaining, by the one or more processors, message data responsive to the received query. The message data may include a plurality of messages associated with at least one messaging platform, the messages may be associated with a plurality of messaging platforms, and at least one of the messages are associated with each of a plurality of messaging platforms. The method may also include identifying, by the one or more processors, one or more first messages of the plurality of messages that are associated with a first messaging platform, and determining, by the one or more processors, that a number of the first messages exceeds a threshold number of messages. In response to the determination that the first message number exceeds the threshold message number, the method may generate, by the one or more processors, a first interface element that includes at least a portion of each of the first messages, and generate, by the one or more processors, a user interface that includes the first interface element. The method may also include providing, by the one or more processors, the generated user interface to at least one of a display device or an audio interface for presentation to a user.

In certain aspects, the method may also include the step of receiving the first messages at the client device, and the message data may include temporal data indicative of at least one of a time or date at which the communications device received each of the first messages. The step of generating the one or more interface elements may also include establishing a chronological ordering of the received first messages based on the temporal data, and arranging the first message portions within the first interface element in accordance with the established chronological ordering. In further aspects, the first message portions may include at least one of textual content or image data, and the first interface element further comprises a portion of the temporal data associated with an initial one of the first messages within the chronological ordering.

The disclosed methods may also include the steps of detecting a user input associated with the presented first interface element, in response to the detected input, generating second interface elements associated with each of the first messages, modifying at least a portion of the user interface to include the second interface elements, and providing the modified user interface to the display device for presentation to the user. In certain aspects, the second interface elements may include portions of corresponding ones of the first messages, the first interface element may correspond to a digest card, and the digest card may provide a summary of the messages included within the first subset of messages.

Additionally, in some embodiments, the disclosed methods may include the steps of identifying second messages within the plurality of messages that are associated with a second messaging platform, determining that a number of the second messages fails to exceed the threshold message number, and in response to the determination that the second message number fails to exceed the threshold message number, generating a second interface element associated with each of the second messages. The second interface elements may, for example, include portions of corresponding ones of the second messages.

Further, the disclosed methods may also include the step of generating a second interface element that include at least a portion of a second one of the messages. In some instances, the query may include at least one keyword, and the portion of the second message may include textual content that includes the keyword, and the method may also include the step of modifying, within the second interface element, at least one visual characteristic of the textual content that includes the keyword. In other instances, the generated user interface may include the second interface element; and the disclosed methods may also include the steps of detecting a user input associated with the presented second interface element and in response to the detected input, at least one of executing an application program associated with the at least one messaging platform or performing operations that initiate an assistant flow. The executed application may, for example, perform one or more operations related to the corresponding message. The disclosed methods may also include determining that a a body of a second one of the messages exceeds a predetermined size and in response to the determination, generating a second interface element that includes a portion of the body of the second message.

In other embodiments, the disclosed methods may include the step of generating a plurality of second interface elements. In some aspects, the second interface elements may be associated with corresponding ones of the messages, the message data may also include temporal data indicative of at least one of a time or date at which the communications device received each of the corresponding messages, and the generated user interface may include the second interface elements. The step of generating the user interface may also include establishing a chronological ordering of the corresponding messages based on the temporal data, and arranging the second interface elements within the user interface in accordance with the established chronological ordering.

Methods consistent with the disclosed embodiments may also include receiving audio data at the communications device, and generating the query based on at least a portion of the received audio data. The audio data may include an utterance spoken by a user into a microphone of the communications device. Additionally, the disclosed methods may include transmitting at least a portion of the received query to a computing system across a communications network, and receiving at least a portion of the message data from the computing system in response to the transmission. In further aspects, at least two of the plurality of messages are selected from a different one of the group consisting of: email, instant messaging, SMS/MMS text messaging, social networking application, and chat-based application.

In other embodiments, corresponding systems, devices, and computer programs, may be configured to perform the actions of the methods, encoded on computer storage devices. A device having one or more processors may be so configured by virtue of software, firmware, hardware, or a combination of them installed on the device that in operation cause the device to perform the actions. One or more computer programs can be so configured by virtue of having instructions that, when executed by device, cause the device to perform the actions.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIGS. 2A-2C, 3, 4A-4B, and 5 are diagrams of exemplary unified interfaces, consistent with the disclosed embodiments.

Like reference numbers and designations in the various drawings indicate like elements.

DETAILED DESCRIPTION

Figure 1:
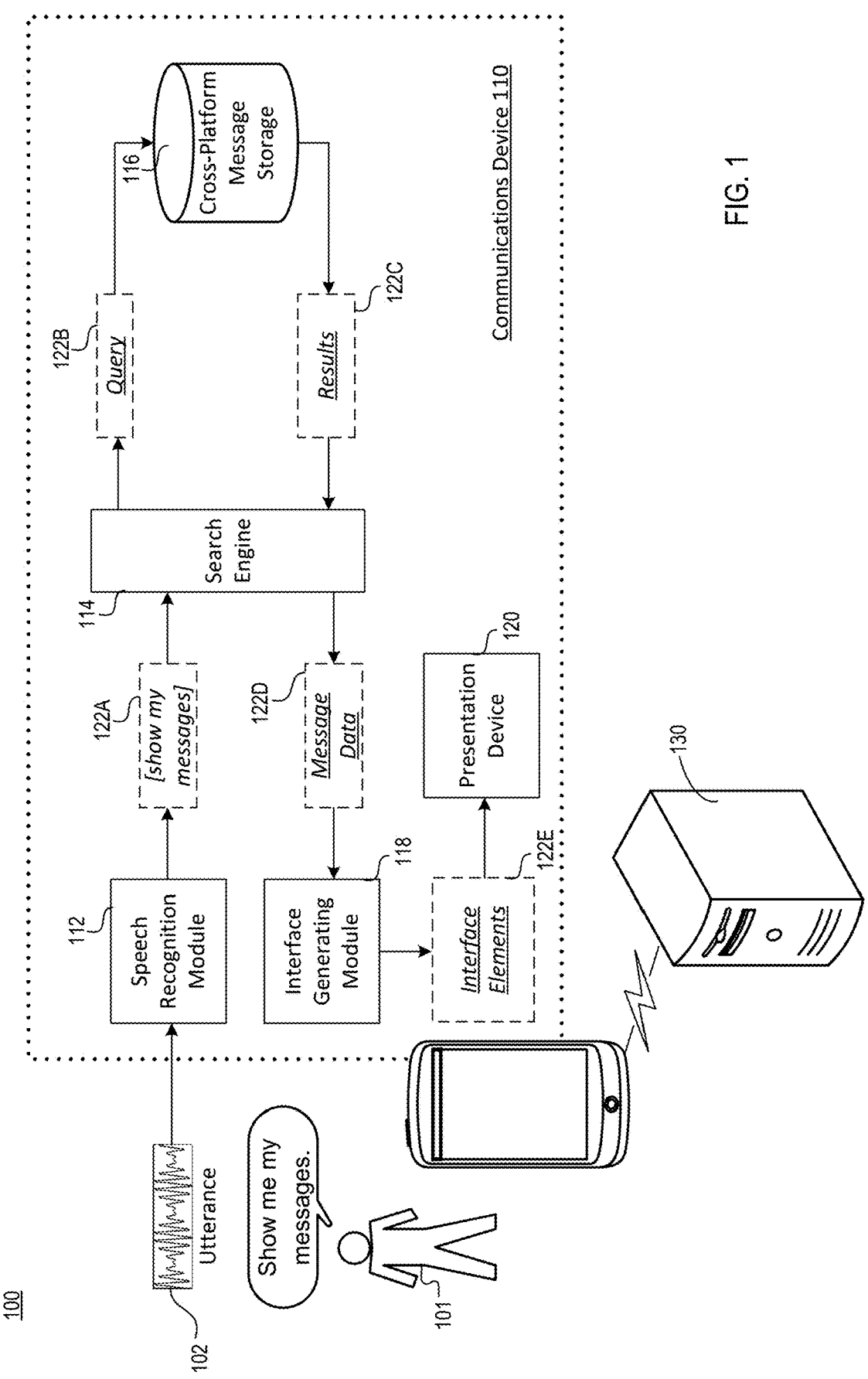
FIG. 1 is a diagram of an exemplary computing system, consistent with the disclosed embodiments.

FIG. 1 is a diagram of an exemplary system 100 that, responsive to a user's query, may perform a search of messaging data generated across multiple messaging platforms, in accordance with the disclosed embodiments. In some aspects, system 100 may include a communications device 110, such as a user's smartphone or tablet computer, and a computing system 130, which may be associated with and/or maintained by one or more messaging platforms. Additionally, although not shown in FIG. 1, system 100 may also include a communications network that interconnects various components of system 100, such as communication device 110 and computing system 130. For example, the communications network may include, but is not limited to, a wireless local area network (LAN), e.g., a "WiFi" network, a RF network, a Near Field Communication (NFC) network, a wireless Metropolitan Area Network (MAN) connecting multiple wireless LANs, and a wide area network (WAN), e.g., the Internet.

In an embodiment, a user 101 of a communications device 110 may generate and receive messages using a number of different messaging platforms, including, but not limited to, various email applications, instant messaging applications, SMS- and/or MMS-based text messaging, social-networking applications, chat-based applications (e.g., Google™ hangouts), and other communications platforms that facilitate text-, voice-, or video-based communications between one or more individuals. Various components of system 100, such as communications device 110 and/or computing system 130, may store data identifying portions of these transmitted or received messages. The stored data, e.g., message data, may include structured data stored in a format consistent with the native messaging platforms and/or metadata characterizing the transmitted and/or received messages. In certain aspects, communications device 110 may perform operations that, in response to a user-specified query, parse locally stored and/or remotely accessible message data to identify one or more messages generated across the various platforms (e.g., cross-platform messages) that are consistent with the user-specified query. In other aspects, and in response to the user-specified search query, communications device 110 may perform operations that generate or access an index built over the transmitted and/or received messages, and that search the index to identify the one or more cross-platform messages that are consistent with the user-specified query, Additionally, in certain aspects, various components of system 100, such as communications device 110, may generate interface elements that, when rendered for presentation, provide a single, unified interface that facilitates user 101's interaction with the identified cross-platform messages. For example, and as described below, the generated interface elements may include a platform-specific interface element, which may describe a portion of the identified messages generated by a corresponding messaging application, and additionally or alternatively, may include a message-specific interface element, which may describe content included within a corresponding one of the identified messages. In certain aspects, as described below, the unified interface may represent a single consistent interface that enables user 101 to identify and interact with messages of interest generated, transmitted, and/or received across multiple messaging platforms.

Referring to FIG. 1, communications device 110 may include a speech recognition module 112, a search engine 114, a cross-platform message storage 116, and an interface generating module 118, which may established by one or more elements of stored code or instructions executed by a processor of communications device 110. In other implementations, communications device 110 may include additional or alternate modules, such as a text-to-speech (TTS) module, which may established by one or more elements of stored code or instructions executed by a processor of communications device 110. Communications device 110 may also include a presentation device 120, such as a touchscreen display, capable of presenting rendered interface elements to user 101.

Communications device 110 may also include an audio interface, such as a microphone, capable of detecting an utterance 102 spoken by user 101, and the audio interface may provide audio data, which includes utterance 102, to a speech recognition module 112. In certain aspects, speech recognition module 112 may apply one or more speech recognition algorithms to the provided audio data to generate corresponding textual output data, and speech recognition algorithms and models consistent with the disclosed embodiments may include, but are not limited to, statistical speech-recognition algorithms, such as hidden Markov models, and machine-learning algorithms, such as deep feedforward and recurrent neural networks. Additionally, in some instances, speech recognition module 112 may be associated with and may leverage the speech-recognition functionality of one or more applications executed by communications device 110, such as the speech recognition functionalities provided by a virtual assistant provided by communications device 110.

By way of example, as illustrated in FIG. 1, user 101 may activate the audio interface (e.g., by uttering a predetermined word or phrase, such as "Okay Google," or alternatively, by touching or tapping a presented interface device associated with the microphone), and utter the phrase "Show me my messages." The audio interface may detect and capture the spoken phrase as utterance 102, and audio data that includes the spoken phrase to speech recognition module 112, which may process the audio data and generate corresponding textual output using any of the exemplary processes described above. Speech recognition module 112 may process the audio data, which include the spoken utterance "Okay, show me my messages," to generate output data 122, which may include recognized textual data corresponding to the spoken utterance, e.g., "show my messages."

Speech recognition module 112 may provide output data 122A to search engine 114, which may process output data 122A to generate search terms and/or criteria for a corresponding search query (e.g., search query 122B). In certain aspects, search engine 114 may access cross-platform message storage 116, identify one or more stored cross-platform messages based on the generated search terms and/or criteria, and obtain, as search results (e.g., search results 122C), portions of the message data that describe the one or more identified cross-platform messages. The obtained portion of the message data may, for example, include metadata that characterizes the identified cross-platform messages (e.g., identifying senders, recipient, send or receipt times, etc.), and additionally or alternatively, portion of the identified cross-platform messages (e.g., portions of the message subjects, message contents, and/or message attachments). Additionally, in some implementations, speech recognition module 112 may provide output data 122A to other modules or components of communications device 110, or to other accessible computing systems or servers, e.g., cloud-based systems and servers, which may process output data 122A to generate search query 122B, as described above.

In some instances, the generated search terms and/or criteria may include, but are not limited to, a term that identifies one or more messaging platforms (e.g., SMS text messages, email messages, chat messages, etc.), a term that identifies a particular sender and/or recipient (e.g., a name, an email address, a telephone number, a handle in a chat or social media network, etc.), a term identifying a particular temporal limitation (e.g., messages sent or received in the last fifteen minutes, thirty minutes, etc.), a term that identifies one or more attributes of the messages (e.g., new messages, unread messages, etc.), and/or a term that identifies a desired word or phrase within the bodies and/or subject of the messages. The disclosed embodiments are, however, not limited to these exemplary search terms and/or criteria, and in other aspects search engine 114 may establish any additional or alternate search term that would be appropriate to the stored cross-platform messages, communications device 110, and to user 101, such as volume-based limitations that caps the number of returned cross-platform messages.

In other instances, speech recognition module 112 may also be configured to detect, within received audio data (e.g., as spoken by user 101), one or more commands that cause communications device 110 to perform additional operations related to a particular cross-platform message. For example, speech recognition module 112 may detect user 101's utterance of 'read it" within the audio data, and communications device 110 may perform operations that convert portions of the text of the specific message to audio content and present that audio content to user 101 through a speaker or other interface. Additionally, in some aspects, speech recognition module 112 may detect user 101's utterance of "skip it" within the audio data, and communications device 110 may perform operations that identify a successive message within a set of search results (e.g., search results 112C or message data 122D), as described below. Speech recognition module 112 may also detect, within the audio data, a presence of user 101's utterance of "reply," which may cause communications device 110 to execute a message composition action via a virtual assistant or execute a native application associated with a corresponding message (e.g., a text-message application) and generate a reply to the corresponding message, as described below.

In other implementations, speech recognition module 112 may detect additional utterances indicative of user 101's interaction with identified and presented messages, such as utterances representing follow-up to a prior utterance and/or that filter the messages included within search results 112C or message data 122D. For example, speech recognition module 112 may detect user 101's utterance of "read the next one from Bob," or "reply to the second one," and communications device 110 may perform any of the exemplary processes described above to identify and present to user 101 a successive message received from "Bob," and/or to perform operations that identify and generate a reply to the second message within the set of search results. The disclosed embodiments are, however, not limited to these exemplary commands or dialog-state phrases, and in other aspects, speech recognition module 112 may identify any additional or alternative command or dialog-state message appropriate to communications device 110 or one or more cross-platform messages, such as "cancel."

In other instances, and in addition to detecting uttered queries, speech recognition module 112 may also be configured to detect additional user inquiries that characterize an identified set of cross-platform messages. For example, speech recognition module 112 may be configured to detect, within the audio data, inquiries that include, but are not limited to, inquiries regarding a number of "new" cross-platform messages (e.g., "how many new emails do I have"), inquiries regarding specific types of cross-platform messages (e.g., "do I have a new SMS"), inquiries regarding when a specific type of cross-platform message was transmitted by a particular contact (e.g., "when did Bob text me last"), inquiries regarding whether user 101 replied to a particular cross-platform message or message thread (e.g., "has the 'my stocks launch' thread been updated"), inquiries as to whether user 101 received a specific type of cross-platform message (or messages) from a contact (e.g., "has Bob sent an email to me" or "did Bob reply to my last SMS"), and/or inquiries that seek to identify a contact that transmitted a recently received cross-platform message (e.g., "who sent the last chat message"). The disclosed embodiments are, however, not limited to these exemplary inquiries, and in other aspects, speech recognition module 112 may be capable of detecting an utterance that include any additional or alternate request to characterize a receive or transmitted cross-platform message appropriate to the message and to communications device 110.

In other implementations, speech recognition module 112 may be configured to detect, within the audio data, inquiries that identify one or more attributes of the cross-platform messages. For example, inquiries consistent with the disclosed embodiments may include, but are not limited to, inquiries that request messages with embedded objects or attachment, inquiries that refer to specific types of embedded objects or attachments, such as images and video, and inquiries that relate to specific concepts mentioned within the messages.

Search engine 114 may, in some aspects, may parse output data 122A, e.g., as received from speech recognition module 112, and automatically generate one or more of the terms and/or criteria for search query 122B based on portion of output data 122A. For example, search engine 114 may establish that output data 112A, which includes "show my messages," corresponds to a request from user 101 to view all cross-platform messages transmitted by or received at communications device 110, and may generate an appropriate search term that facilitates a search of all stored messages across any messaging platform.

In other aspects, search engine 114 may establish one or more of the search terms and/or criteria in accordance with previously established or "default" parameters or values. For example, search engine 114 limit search results 122C to those messages transmitted from or received by communications device 110 within a predetermined prior time period, such as fifteen minutes, and search engine 114 may establish an appropriate "default" search term based on this temporal limitation. Search engine 114 may, in some aspects, be configured to modify certain ones of the default search terms in response to user input received via output data 122A (e.g., a portion of the user 101's utterance that requests messages within the last thirty minutes) and additionally or alternatively, may be configured to present user-specific modifications to certain others of the default search terms (e.g., a limitation on a number of returned messages established based on a functionality of communications device 110).

In an embodiment, and as described above, search engine 114 may access cross-platform message storage 116, and based on search query 122B, may identify one or more cross-platform messages that are consistent with the established search terms and/or criteria. For example, cross-platform message storage 116 may include data (e.g., message data) identifying messages (e.g., cross-platform messages) generated by, transmitted from, and received by communications device 110 using multiple and different messaging platforms. In other implementations, data identifying one or more of the cross-platform messages generated by, transmitted from, and received by communications device 110 may be stored in one or more remote data repositories accessible to communications device 110 across the network, such as cloud-based repositories and repositories associated with the messaging platforms. As described above, these multiple messaging platforms may include, but are not limited to, email applications and clients, social-networking applications, text and instant messaging applications, SMS- and MMS-based text messaging, text-, voice-, and/or video-based chat applications, other communications platforms that facilitate text-, voice-, or video-based communications between one or more individuals.

The message data may, by way of example, include structured data records that, for each of the cross-platform messages, identify a message direction (e.g., transmitted or received by communications device 110), a sender and/or a recipient, a timestamp associated with transmission or receipt, additionally or alternatively, a messaging platform that facilitated the transmission or receipt. Additionally, in some instances, cross-platform message storage 116 may include metadata that characterizes one or more of the cross-platform messages, the storage locations of which may be linked to corresponding ones of the structured data records. Further, in certain embodiments, one or more of the multiple messaging platforms may be accessible to an operating system of communications device 110 (e.g., Android™, iOS™, etc.), search engine 114 may access the messages transmitted or received by these accessible messaging platforms and perform indexing operations on portions of these messages, such as the message subjects and message bodies.

In certain aspects, search engine 114 may identify one of more of the cross-platform messages stored within cross-platform message storage 116 that are consistent with the search terms and/or criteria. For example, as described above, search engine 114 may determine that output data 122 corresponds to a request from user 101 to view all cross-platform messages transmit by or received at communications device 110, and may query cross-platform message storage 116 to identify the requested cross-platform messages, subject to any of the temporal-based and/or volume-based restrictions described above.

In other aspects, the search terms of search query 122B may identify a specific sender or a specific recipient, and additionally or alternatively, a specific messaging platform, and search engine 114 may access the structured data records of cross-platform message storage 116 to identify one or more of the cross-platform messages associated with the specific sender, specific recipient, and/or specific messaging platform. Further, and as described above, search engine 114 may determine, based on output data 122A, that utterance 102 represents a request by user 101 to view messages that included specific words or phrases within their subject lines or bodies and search engine 114 may generate search terms that include the specific words or phrases. In certain aspects, search engine 114 may access the indexed portions of the cross-platform messages, e.g., as stored within cross-platform message storage 116, and identify one of more of the cross-platform messages whose subject lines and/or bodies include the specific words or phrases.

As described above, search engine 114 may obtain search results 122C that include message data corresponding to the identified messages (e.g., that are consistent with the search terms of query 122B) and additionally or alternatively, portions of the identified messages, such as portions of the subject lines and bodies of the identified messages. By way of example, search engine 114 may extract portions of the message data from the structured data records stored within cross-platform message storage 116, and the message data within results 122C may include, but is not limited to, data that identifies the sender, the recipient, the messaging platform, and the timestamp for each of the identified messages. Further, in additional aspects, search engine 144 may provide search results 122C, along with additional data identifying the terms of search query 122B, to interface generating module 118 within as message data 122D.

Interface generating module 118 may generate one or more interface elements (e.g., interface elements 122E) that include textual and/or graphical data that describes the cross-platform messages identified within search results 122C and further, may generate a unified interface that includes the one or interface elements. Interface generating module 118 may provide data specifying interface elements 122E and the generated unified interface (e.g., data describing a layout and arrangement of interface elements 122E within the unified interface, dimensions of interface elements 122E within the unified interface, shape of interface elements 122E within the unified interface, data describing a layout and arrangement of portions of information within interface elements 122E, etc.) to a presentation device 120 of communications device 110. Presentation device 120 may include, but is not limited to, a touchscreen display unit, and may be configured to render and present the user interface, which includes portions of interface elements 122E, to user 101. In certain aspects, as described below, the unified interface may represent a single, consistent interface that facilitates not only user 101's inspection of the cross-platform messages that match portions of the spoken query, but also user 101's interaction with these and other cross-platform messages based on spoken input and other input channels.

Figure 2B:
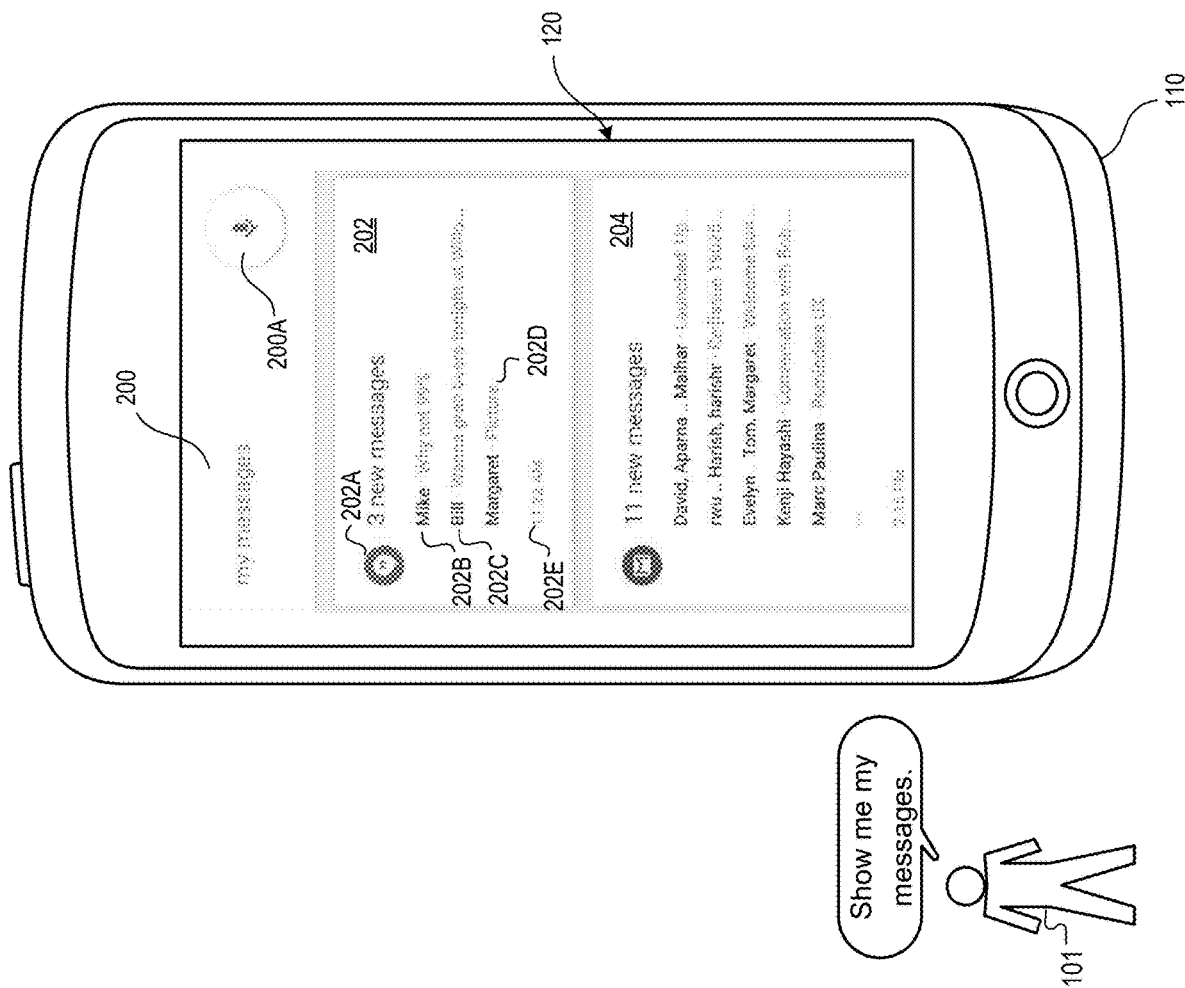

FIG. 2A illustrates an exemplary interface element 201, which may be generated by interface generating module 118 and presented within a unified interface 200 by presentation device 120 in accordance with the disclosed embodiments. In some aspects, communications device 110 may present interface element 201 within a corresponding user interface. As illustrated in FIG. 2A, interface element 201 may be rectangular in shape, and may be characterized by a first dimension 201A established by a lateral dimension of presentation device 120 (e.g., a width of a touchscreen display of communication device 110) and a longitudinal dimension 201B established by interface generating module 118 based on an amount of included content and/or one or more dimensional limitations. Additionally or alternatively, unified interface 200 may also include an additional interface element, e.g., icon 200A, associated with an audio interface, such as a microphone, capable of detecting an utterance spoken by user 101. In some aspects, user 101 may tap, touch, or provide other input selecting icon 200A, which may cause communications device 110 to activate one or more functionalities of the audio interface, as described above.

By way of example, and upon presentation by presentation device 120, user 101 may perceive that interface element 201 is visually similar in shape and/or size to an index or business card. In view of the perceived similarity, and in certain aspects, one or more of interface elements 122E, including interface element 201, may be characterized as electronic "message" cards that describe one or more cross-platform messages matching the search query uttered by user 101. The disclosed embodiments are, however, not limited to interface elements having these exemplary shapes, and in other aspects, interface elements consistent with the disclosed embodiments may be characterized by any additional or alternate shape appropriate to the cross-platform messages and presentation device 120, include other regular polygons, circular or ellipsoidal shapes, and other user-defined or user-specified shapes.

In some aspects, interface elements 122E may include a message-specific interface element (e.g., a message card) that identifies and describes a corresponding one of the cross-platform messages included within message data 122D. For example, as illustrated in FIG. 2A, interface element 201 may corresponding to a message transmitted to user 101 from "Randy Wilson" at 11:15 a.m. and including, within the message body, textual data specifying "Wanna grab a bit to eat at Masa" In some aspects, message data 122D may include, for the transmitted message, data identifying the sender, the recipient, the corresponding messaging platform (e.g., an text-messaging application), and at least a portion of the message body (e.g., "Wanna grab a bit to eat at Masa?"). In some aspects, interface generating module 118 may receive and process message data 122D to extract the data identifying the sender, the recipient, the corresponding messaging platform, and the portion of the message body of the transmitted message, and may generate interface element 210 that include portions of the extracted data.

For example, interface element 201 may include textual data identifying the sender of the message (e.g., "Randy Wilson"), the recipient (e.g., "me"), a time of receipt (e.g., "11:28 a.m.") and the body of the message (e.g., "Wanna grab a bit to eat at Masa?"). In certain aspects, the sender name (e.g., "Randy Wilson") may be included within message data 122D. In other aspects, however, message data 122D may include an identifier of the sender within the text-messaging application (e.g., a telephone number, user name, or other handle), and interface generating module 118 (and additionally or alternatively, other modules of communications device 110) may access a contact list or other data associated with the text-messaging application and identify the sender's name based on a correspondence with the sender identifier. Further, in some aspects, when the body of the message exceeds a predetermined size (e.g., a number of characters exceeds a predetermined limit, a number of lines of text exceeds the predetermined limit, a number of words exceeds the predetermined limit, etc.), interface generating module 118 may truncate the message body and include only a portion of the message body within an interface element, such as interface element 201 and other interface elements described below.

In further aspects, interface generating module 118 may also include graphical content 210C, such as an avatar or image associated with the sender and an image or icon representative of the text-messaging application. By way of example, interface generating module 118 (and additionally or alternatively, other modules of communications device 110) may obtain the avatar or image of the sender, e.g., "Randy Wilson," from the contact list or other data associated with the text-messaging application, and further, may obtain the image or icon representative of the text-messaging application from a data repository maintained by an operating system executed by communications device 110. The disclosed embodiments are, however, interface elements that include these exemplary data elements, and in other aspects, interface generating module 118 may generate interface element that include any additional or alternate data information that would be appropriate to the identified messages and presentation device 120.

In additional aspects, user 101 may provide input to communications device 110 that enables user 101 to interact with the message received from "Randy Wilson" at 11:15 a.m., as described within interface element 201. For example, user 101 may utter one or more specific phrases that, upon detection by the audio interface and processing by speech recognition module 112, cause communications device 110 to execute the corresponding text-messaging application and interact with the received message. For example, user 101 may utter the term "Reply," and upon detection by the audio interface and processing by speech recognition module 112, communications device 110 may execute the text message application and enable user 101 to provide additional input in response to the message. In additional or alternate aspects, user 101 may touch, tap, or otherwise content a surface of presentation device 120 (e.g., a touchscreen display) associated with a region 200B of unified interface 200, and in response to the detected input, communications device 110 may execute the text message application and enable user 101 to provide additional input in response to the message. The disclosed embodiments are, however, not limited to these additional input types and these exemplary operations, and in other aspects, communications device 110 may enable user 101 to provide any additional or alternate spoken or manual input to perform any additional or alternate operations associated with the cross-platform message, such as "delete," "forward," etc.

As described above, message data 122D may include data identifying one or more cross-platform messages (e.g., the message from "Randy Wilson" described above) that are consistent with the search query uttered by user 101. Depending on a breadth of the uttered search query, the number of identified cross-platform messages that are consistent with the uttered search query may be large, and the dimensions of presentation device 120 may render impractical the generation of a unified interface including message-specific interface elements that characterize each of the identified messages. In certain aspects, and in addition to or as an alternate to the message-specific interface elements described above, interface generating module 118 may also generate a platform-specific interface element, e.g., a digest card, that includes textual and graphical content characterizing multiple messages received by or transmitted from communications device 110 using a corresponding one of the messaging platforms.

In one aspect, and based on message data 122D, interface generating module 118 may selectively generate message-specific and platform-specific interface elements based on the number of identified cross-platform messages that are consistent with the uttered search query. For example, interface generating module 118 (and additionally or alternatively, other modules of communications device 110) may establish that user 101 is capable of readily viewing a threshold number of distinct, message-specific interface element (e.g., message cards) within presentation device 120 of communications device 110, communications device 110 may store data indicative of the threshold interface-element number within a locally accessible data repository. Interface generating module 118 may, in certain aspects, determine the number of discrete cross-platform messages included within message data 122D, and when the determined number falls below the established threshold number, interface generating module 118 may elect to generate message cards for each of cross-platform messages using any of the exemplary processes described herein. Alternatively, if interface generating module 118 were to determine that the determined number exceeds the established threshold number, interface generating module 118 may elect to generate one or more digest cards that include textual and graphical content summarizing groups of the cross-platform messages associated with corresponding ones of the messaging platforms.

For instance, as described above, search query 122B may correspond to a request from user 101 to view all cross-platform messages transmitted by or received at communications device 110 within a prior temporal interval, e.g., thirty minutes. By way of example, search engine 114 may identify fourteen cross-platform messages received and/or transmitted by communications device 110 within the last thirty minutes, and these cross-platform messages may include three messages received using a text-messaging application and eleven messages received by using an email application, such as Gmail™. Search engine 114 may provide data associated with these fourteen messages (e.g., sender, recipient, messaging platform, message content, etc.) to interface generating module 118 within message data 122D using any of the exemplary processes described above, and may determine that these fourteen messages exceed the threshold number of messages that trigger the generation of platform-specific interface elements (e.g., seven messages).

In certain aspects, and based on the determination, interface generating module 118 may generate a first digest card that identifies and summarizes the three cross-platform messages received using the text-messaging application, and a second digest card that identifies and summarizes the eleven cross-platform messages received using the email application. For example, message data 122D may include text messages transmitted from "Mike," "Bill," and "Margaret" to user 101 using the text-messaging application, and message data 112D may include, for each of these three messages, data identifying the sender (e.g., "Mike," "Bill," or "Margaret"), the recipient (e.g., user 101), the corresponding messaging platform (e.g., the text-messaging application), and a portion of the corresponding message bodies.

Interface generating module 118 may access message data 122D and extract the data identifying the sender, the recipient, the corresponding messaging platform, and the portion of the message body for each of the three text-messages. In certain aspects, illustrated in FIG. 2B, interface generating module 118 may generate the first digest card (e.g., digest card 202) that identifies and summarizes the three cross-platform messages received using the text-messaging application, which may be presented to user 101 within unified interface 200 by presentation device 120. For instance, in FIG. 2B, digest card 202 may include an icon or image 202A that identifies the text-messaging application (e.g., as maintained by communication device 110's operating system within a corresponding data repository), and content 202B, 202C, and 202D, that identifies the text messages transmitted, respectively, by "Mike," "Bill," and "Margaret" to user 101. By way of example, content 202B, 202C, and 202D may identify a corresponding one of the senders (e.g., "Mike," "Bill," or "Margaret") and portions of the corresponding message bodies, which may be truncated depending on a length of the message body and a dimension of interface element 202. Additionally, digest card 202 may also include a time stamp 202E, which may specify an earliest one of the receipt times of three text-messages (e.g., as extracted by interface generating module 118 from message data 122D).

Additionally, in some aspects, interface generating module 118 may access message data 122D and extract the data identifying the sender, the recipient, the corresponding messaging platform, and the message body portion for each of the eleven messages received through the email application. Using any of the exemplary processes described above, interface generating module 118 may generate the second digest card (e.g., digest card 204) that identifies and summarizes the eleven cross-platform messages received using the text-email application, which may also be presented to user 101 within unified interface 200 by presentation device 120. Digest card 204 may include content associated with the eleven email messages that is similar to the text-message content described above with respect to digest card 202, and digest card 204 may also include an icon or image associated with the email application and a time stamp specifying an earliest one of the receipt times of eleven email messages. Further, although described in terms of textual and graphical content, the disclosed embodiments are not limited to digest cards and platform-specific interface elements that include this exemplary content, and in other aspects, the disclosed digest cards may include any additional or alternate elements of textual or graphical content appropriate to the cross-platform messages and to presentation device 120.

Figure 2C:
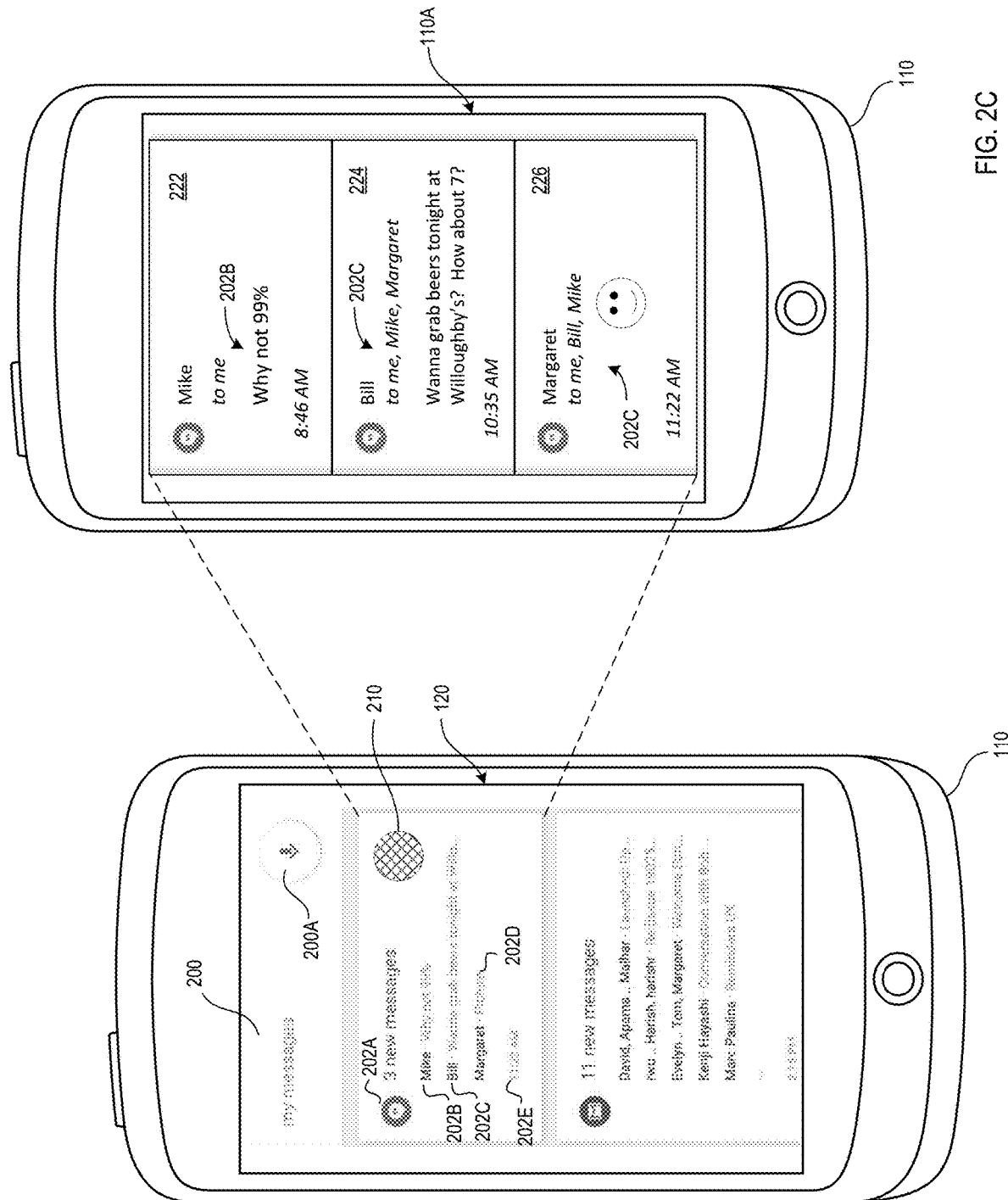

In further embodiments, user 101 may view digest card 202, and may wish to obtain more detailed information that characterizes each of the three text messages received from "Mike," "Bill," and "Margaret." In certain aspects, illustrated in FIG. 2C, user 101 may provide additional input related to digest card 202 (e.g., the platform-specific interface element summarizing cross-platform messages received via the text-messaging application), which may cause interface generating module 118 to generate additional interface elements that characterize corresponding ones of the three text messages received from "Mike," "Bill," and "Margaret," and provide these additional interface elements (e.g., interface elements 122E) to presentation device 120 for rendering and presentation to user 101.

For example, as illustrated in FIG. 2C, user 101 may touch or tap a surface of presentation device 120 corresponding to a particular region 210 of digest card 202, and in response to the received input, interface generating module 118 may generate message cards 222, 224, and 226 that include content describing corresponding ones of text messages 202B, 202C, and 202D, and may provide message cards 222, 224, and 226 (and additionally or alternatively, data describing a dimension, layout, and/or format of message-specific interface elements 222, 224, and 226) to presentation device 120, which may render and present message cards 222, 224, and 226 to user 101 through unified interface 200.

In certain aspects, the content of message cards 222, 224, and 226 may be similar to that described above in reference to message card 201, and may include, for example, content identifying the senders (e.g., "Mike," "Bill," or "Margaret"), the recipient (e.g., user 101), the messaging platform (e.g., the text-messaging application), and portions of the bodies of the corresponding text messages. The portions of the text-message bodies included within message cards 222, 224, and 226 may include textual content (e.g., in message cards 222 and 224), image data (e.g., in message card 226), video content, and any additional or alternate multimedia content appropriate to interface generating module 118 and presentation device 120. In further aspects, however, interface generating module 118 may be configured to exclude the image, video, and other multimedia content within these and other messages from the digest cards (e.g., digest cards 202 and 204), and instead include predetermined text to indicate, to user 101, the presence of mage, video, and/or multimedia content within the underlying messages (e.g., "image" text in digest card 202 of FIGS. 2B and 2C).

In certain embodiments described above, an utterance spoken by user 101 corresponds to a request to view all cross-platform messages transmitted by or received at communications device 110 during a particular temporal interval, e.g., thirty minutes. The disclosed embodiments are, however, not limited to these exemplary requests, and in other aspects, search queries consistent with the disclosed embodiments may specify any additional or alternate characteristic of the stored cross-platform messages, which may include a particular sender and/or receiver, a particular messaging platform, a presence of words or phrases within corresponding message subjects or message bodies, and/or a particular date range.

For example, user 101 may, through presentation device 120 of communications device 110, view the message and/or digest cards that characterize the cross-platform messages received during the past thirty minutes. As a follow-up to user 101's prior query, or an alternative to user 101's prior query, user 101 may utter a request to view those messages sent to user 101 by a particular individual, e.g., "Randy Wilson," during the past thirty minutes. Using any of the exemplary processes, the audio interface of communications device 110 may capture and provide the uttered request (e.g., as utterance 102) to speech recognition module 112, which may generate output data corresponding to the spoken request and provide that output data to search engine 114. Further, and using the exemplary processes described above, search engine 114 may process the output data to generate terms and/or criteria of a corresponding search request (e.g., terms of search request 122B, which may identify the sender "Randy Wilson," the particular time period, and that results should not be limited to particular messaging platforms), access cross-platform message storage 116, and obtain data identifying all cross-platform messages sent to user 101 by "Randy Wilson" within the last thirty minutes (e.g., as search results 122C).

In some instances, and consistent with the processes described above, search engine 112 may provide portions of the obtained message data and information identifying the terms of search query 122B to interface generating module 118 (e.g., as message data 122D). For example, message data 122D may include data that identifies the sender (e.g., "Randy Wilson"), the recipient (e.g., user 101), a messaging platform, a time stamp, and message portions for six cross-platform messages transmitted from "Randy Wilson" to user 101 during the last thirty minutes. As outlined above, interface generating module 118 may access the previously established threshold number of messages that trigger a generation of platform-specific interface elements, and may compare that threshold number against the number of cross-platform messages in message data 122D.

As described above, the threshold number may include seven messages, and as message data 122D includes six cross-platform messages, interface generating module 118 may elect to generate message-specific interface elements, e.g., message cards, corresponding to each of the six cross-platform messages using any of the exemplary processes described above. Interface generating module 118 may also provide data associated with the generated interface elements (e.g., interface elements 122E) to presentation device 120, which may present the generated message cards to user 101 within a unified interface.

Figure 3:
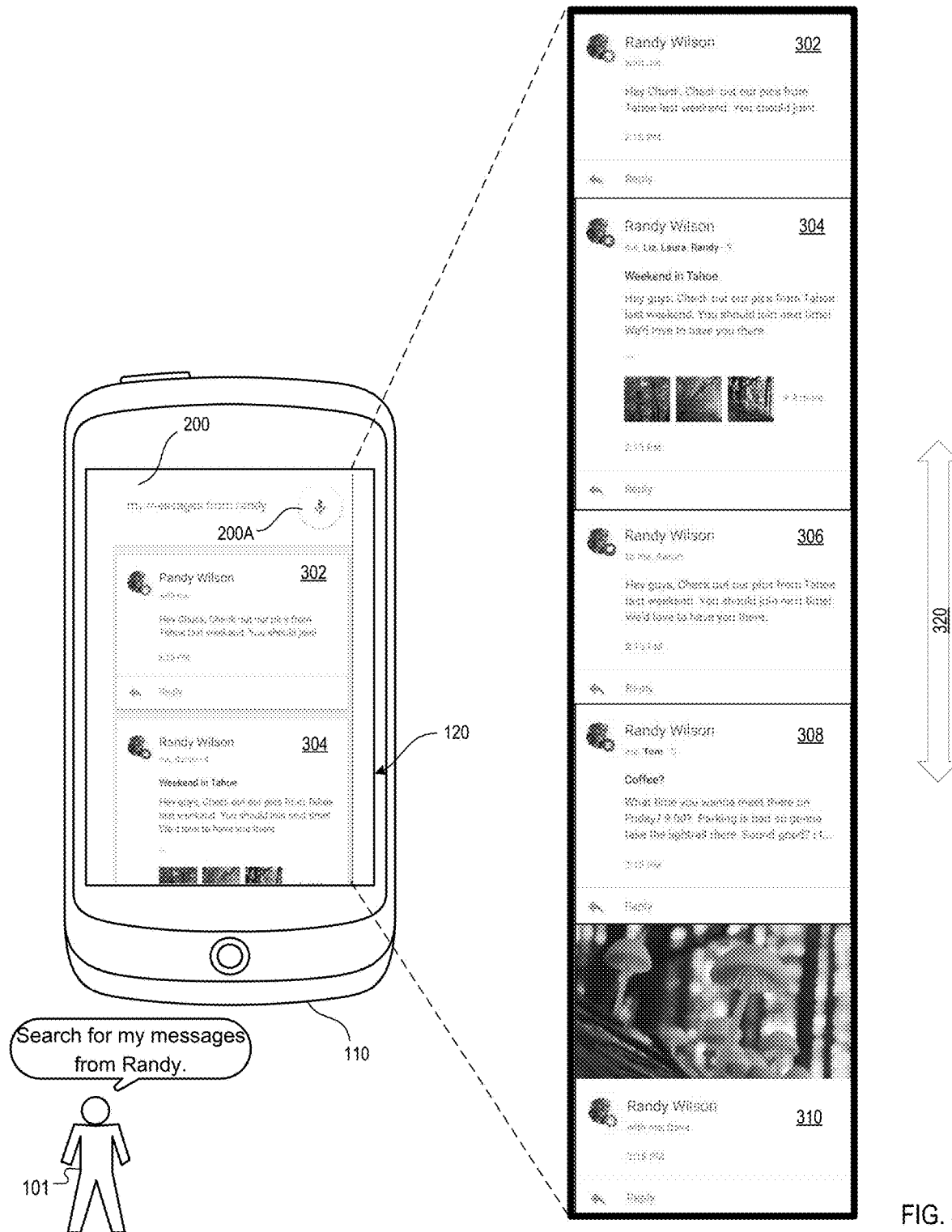

By way of example, FIG. 3 illustrates additional exemplary portions of unified interface 200, in accordance with the disclosed embodiments. For example, as illustrated in FIG. 3, interface generating module 118 may generate message cards 302, 304, 306, 308, and 310, which include information and content that describes and characterizes corresponding ones of the cross-platform messages transmitted to user 101 by "Randy Wilson" during the past thirty minutes. For example, message cards 302, 306, and 310 may correspond to text messages received from "Randy Wilson" using various text-messaging applications, and message cards 304 and 308 may correspond to email messages received from "Randy Wilson" using various email applications. In certain aspects, each of message cards 302, 304, 306, 308, and 310 may include content similar to that described above in reference to message card 201, which includes, but is not limited to, a sender, a recipient, a corresponding messaging platform, and a portions of a corresponding message body or a message subject.

In certain aspects, interface generating module 118 and/or presentation device 120 may arrange message cards 302, 304, 306, 308, and 310 within unified interface 200 chronologically in order of their receipt by or transmission from communications device 110. Further, in additional or alternate aspects, interface generating module 118 and/or presentation device 120 may arrange message cards 302, 304, 306, 308, and 310 in order according to their corresponding messaging platforms or based on any additional or alternate message characteristics, including combinations of characteristics such as receipt or transmission time, sender, recipient, messaging platform and/or relevance to the user's query.

In some embodiments, presentation device 120 may be insufficiently large to simultaneously present message cards 302, 304, 306, 308, and 310 to user 101 at any meaningful display resolution. In certain aspects, depicted in FIG. 3, presentation device 120 may present a subset of messaging cards 302, 304, 306, 308, and 310 within a particular viewing pane of unified interface 200 (e.g., messaging card 302 and a portion of messaging card 304 in FIG. 3), and user 101 may scroll through additional viewing panes of unified interface 200 to view additional subsets of messaging cards 302, 304, 306, 308, and 310 (e.g., by contacting a surface of a touchscreen display with a fingertip or stylus, and subsequent moving the fingertip or stylus across the surface along direction 320).

Figure 4A:
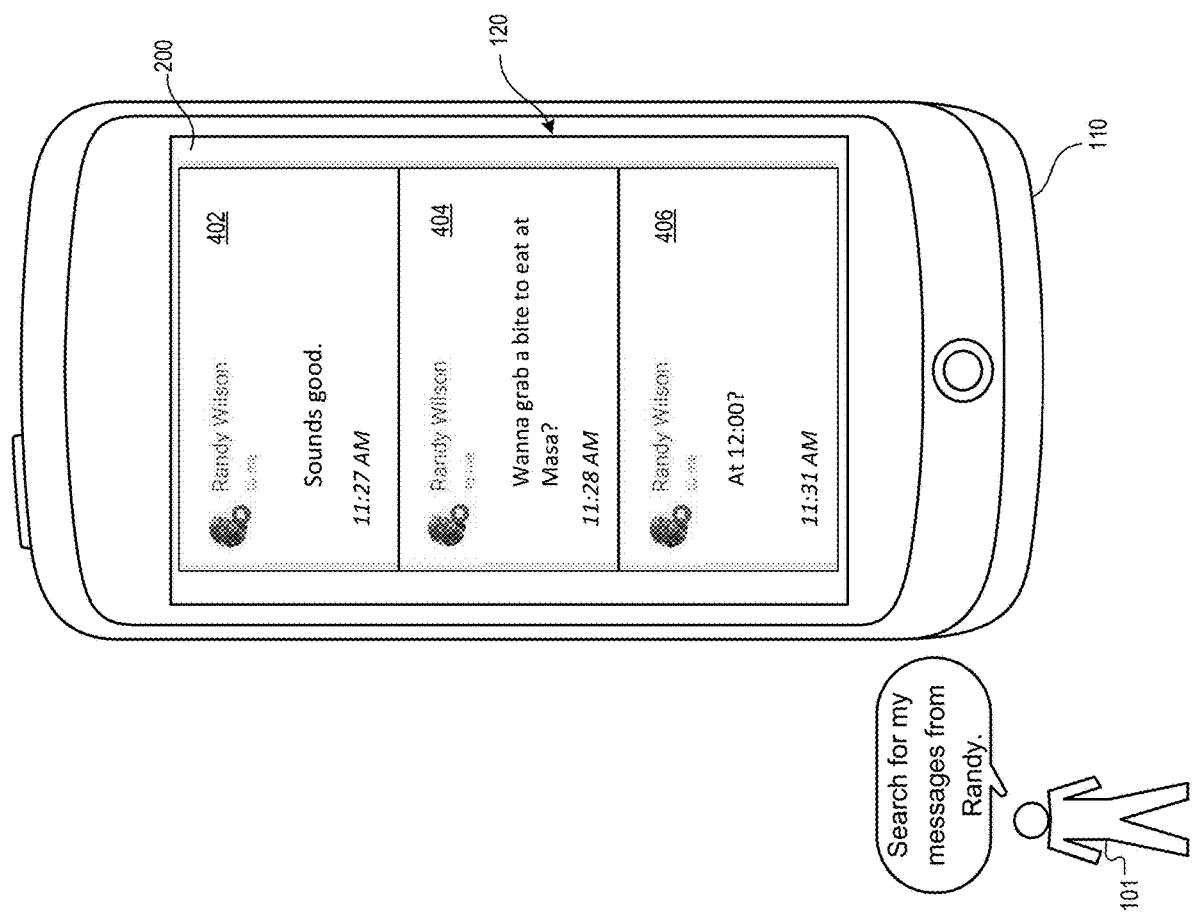

In other embodiments, and to address the potential inability of presentation device 120 to simultaneously present multiple message cards (e.g., message-specific interface elements), interface resolution module 118 may be configured to generate a merged interface element (e.g., a merged message card) that describes multiple cross-platform messages that are consistent with the uttered search query and are transmitted from and/or received by communications device 110 within a predetermined time period. For example, as illustrated in FIG. 4A, interface generating module 118 may generate message cards 402, 404, and 406 include content describing and characterizing text messages received from "Randy Wilson" using a text-messaging application at 11:27 a.m., 11:28 a.m., and 11:31 a.m., respectively. Presentation device 120 may, for example, sort and present these message cards within unified interface 200 in order of their times of receipt, or in accordance with any additional or alternate message characteristic or combinations of messaging characteristics.

In certain aspects, interface generating module 118 (and additionally or alternatively, any other component of communications device 110) may determine that communications device 110 received the text messages associated with message cards 402, 404, and 406 (e.g., as received from "Randy Wilson") within the predetermined time period. For example, the predetermined time period may corresponding to a time period of five minutes, and interface generating module 118 may determine that communication device 110 received the first text message (e.g., corresponding to message card 402) at 11:27 a.m., and received the second and third text messages (e.g., corresponding to message cards 404 and 406) within the five-minute time period the initial text message. In certain aspects, a value of the predetermined time period may be established and/or modified by interface generating module 118 (and additionally or alternatively, another component of communications device 110) to capture multiple related text messages related to a particular topic of discussion between user 101 and one or more other individuals, and although described in terms of a five-minute interval, predetermined time periods consistent with the disclosed embodiments may include any additional or alternate appropriate temporal interval capable of capturing exchanges of successive and related cross-platform messages.

Figure 4B:
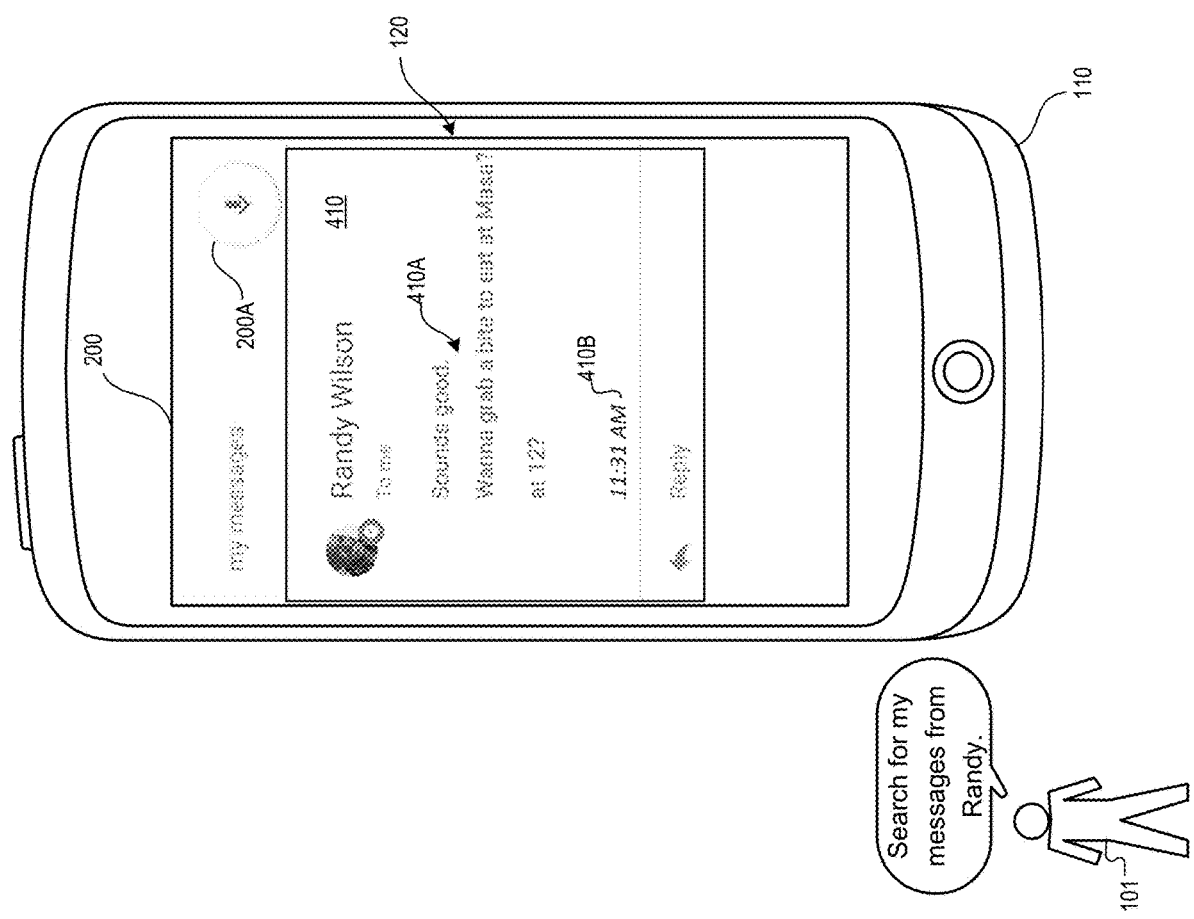

In an embodiment, and responsive to the determination that communications device 110 received the three text messages within the predetermine time period, interface generating module 118 may generate a merged interface element, e.g., merged message card 410, that includes data identifying and describing each of the three text messages, as illustrated in FIG. 4B. For example, in FIG. 4B, merged message card 410 may include message data 410A, which includes portions of the bodies and/or subjects of each of the three messages, and time stamp 410B, which corresponding to a time at which communications device 110 received the first or final of the three text messages (e.g., corresponding to message card 406). In some instances, interface generating module 118 may arrange the portions of the message bodies and/or subjects within message data 410A based on a chronological order in which communications device 110 received the corresponding text messages. Additionally or alternatively, merged message card 410 may include data identifying the sender (e.g., "Randy Wilson"), an avatar or image associated with the sender, data identifying the recipient (e.g., user 101), and an icon or image associated with the messaging platform, as described above.

In certain of the disclosed embodiments, an utterance spoken by user 101 corresponds to a request from to view all cross-platform messages transmitted by or received at communications device 110 during a particular temporal interval, e.g., thirty minutes, or received at communications device 110 from a particular sender during that temporal interval. As described above, however, the disclosed embodiments are not limited to these exemplary requests, and in other aspects, search queries consistent with the disclosed embodiments may specify any additional or alternate characteristic of the stored cross-platform messages, which may include a particular recipient, a particular messaging platform, a presence of words or phrases within corresponding message subjects or message bodies, and/or a particular date range. Further, in additional aspects, the disclosed embodiments may also identify, and present to user 101, one or more cross-platform messages that match combinations of the exemplary search terms described above.

For example, user 101's uttered search query may represent a request to view all cross-platform messages received from a particular sender (e.g., "Liz Day") within a particular time period (e.g., thirty minutes) that include specific words or phrases within their subject lines or bodies (e.g., the word "Tahoe"). Using any of the exemplary processes, the audio interface of communications device 110 may capture and provide the uttered request (e.g., as utterance 102) to speech recognition module 112, which may generate output data (e.g., output data 122A) corresponding to the spoken request and provide that output data to search engine 114. Further, and using any of these exemplary processes, search engine 114 may obtain and provide to interface generating module 118 messaging data (e.g., message data 122D) that identifying one or more cross-platform messages that include the word "Tahoe" and were received from sender "Liz Day" within the last thirty minutes. As described above, message data 122D may include, for each of the identified cross-platform messages, data that identifies the sender (e.g., "Liz Day"), the recipient (e.g., user 101), a messaging platform, a time stamp, and portions of the identified cross-platform messages that include the word "Tahoe." Further, in certain aspects, messaging data 122D may also identify one or more terms and/or criteria of the uttered search query, including the specified sender, the specified word (e.g., "Tahoe"), and/or the specified time period (e.g., thirty minutes).

Figure 5:
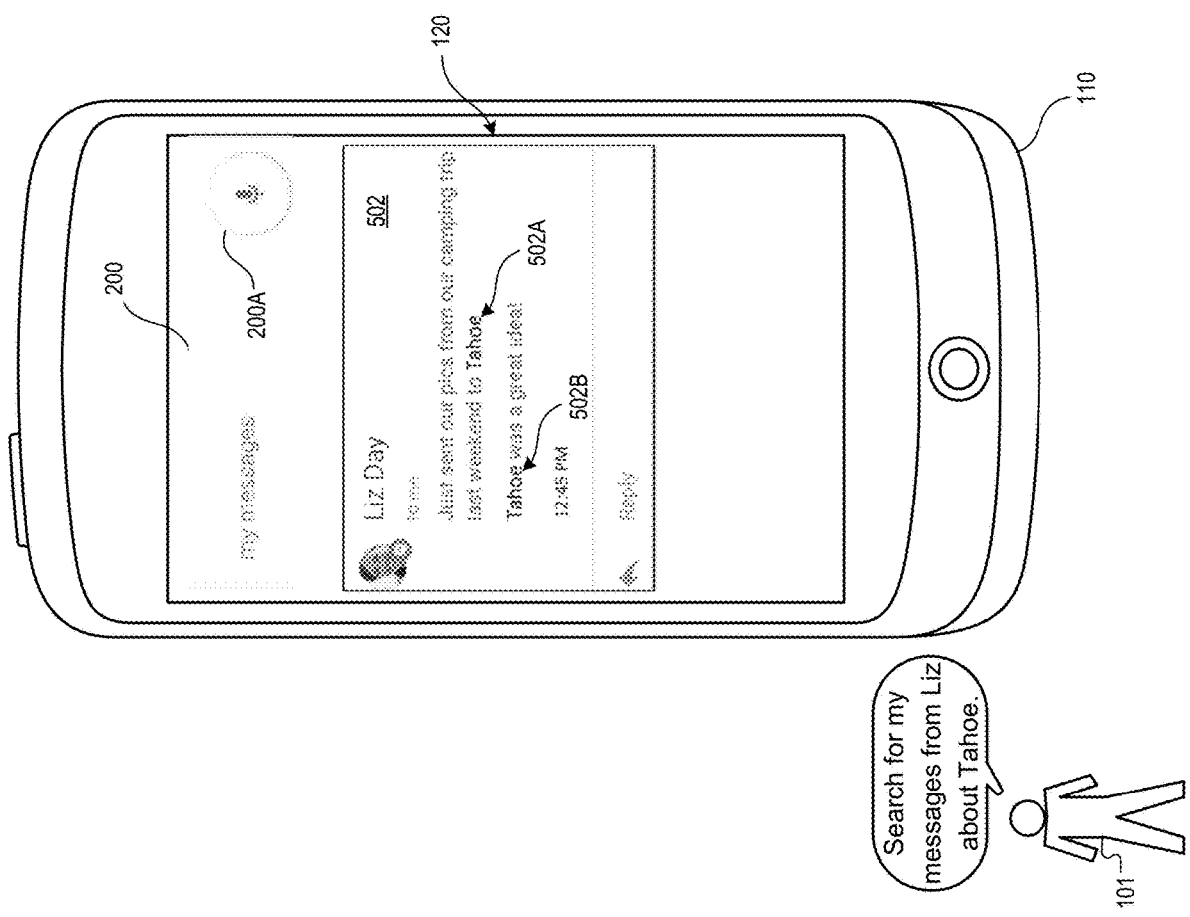

In some instances, and based on a number of identified message, interface generating module 118 may generate one or more platform-specific interface elements (e.g., digest cards) and/or message-specific interface elements (e.g., message cards) that characterize and describe the identified cross-platform messages using any of the exemplary techniques described above. For example, message data 122D may identify a single cross-platform message associated with the specified sender, e.g., "Liz Day," that that includes the specified word, e.g., "Tahoe," and as illustrated in FIG. 5, interface generating module 118 may generate a single message card 502 for presentation within unified interface 200 by presentation device 120. In some aspects, as described above, message card 502 may include data identifying the sender (e.g., "Liz Day"), an avatar or image associated with the sender, data identifying the recipient (e.g., user 101), and an icon or image associated with the messaging platform. Further, in FIG. 5, message card 502 may also include a portion of the identified message that includes the specified word "Tahoe," and interface generating module 118 may generate and transmit data instructing presentation device 120 to modify a visual characteristic of the specified work within the presented message portions. For example, interface generating module 118 may instruct presentation device 120 to highlight text portions 502A and 502B as bolded text, which represent portions of the presented message body that include the word "Tahoe." The disclosed embodiments are, however, not limited to processes present specified words within the message body using bold text, and in other aspects, interface generating module 118 may instruct presentation device 120 to modify any additional or alternate visual characteristic of the presented message portions to highlight a presence of specific words or phrases to user 101, include underlying portions of text, a modification to text color, and/or a modification to a font or a font size.

Figure 6:
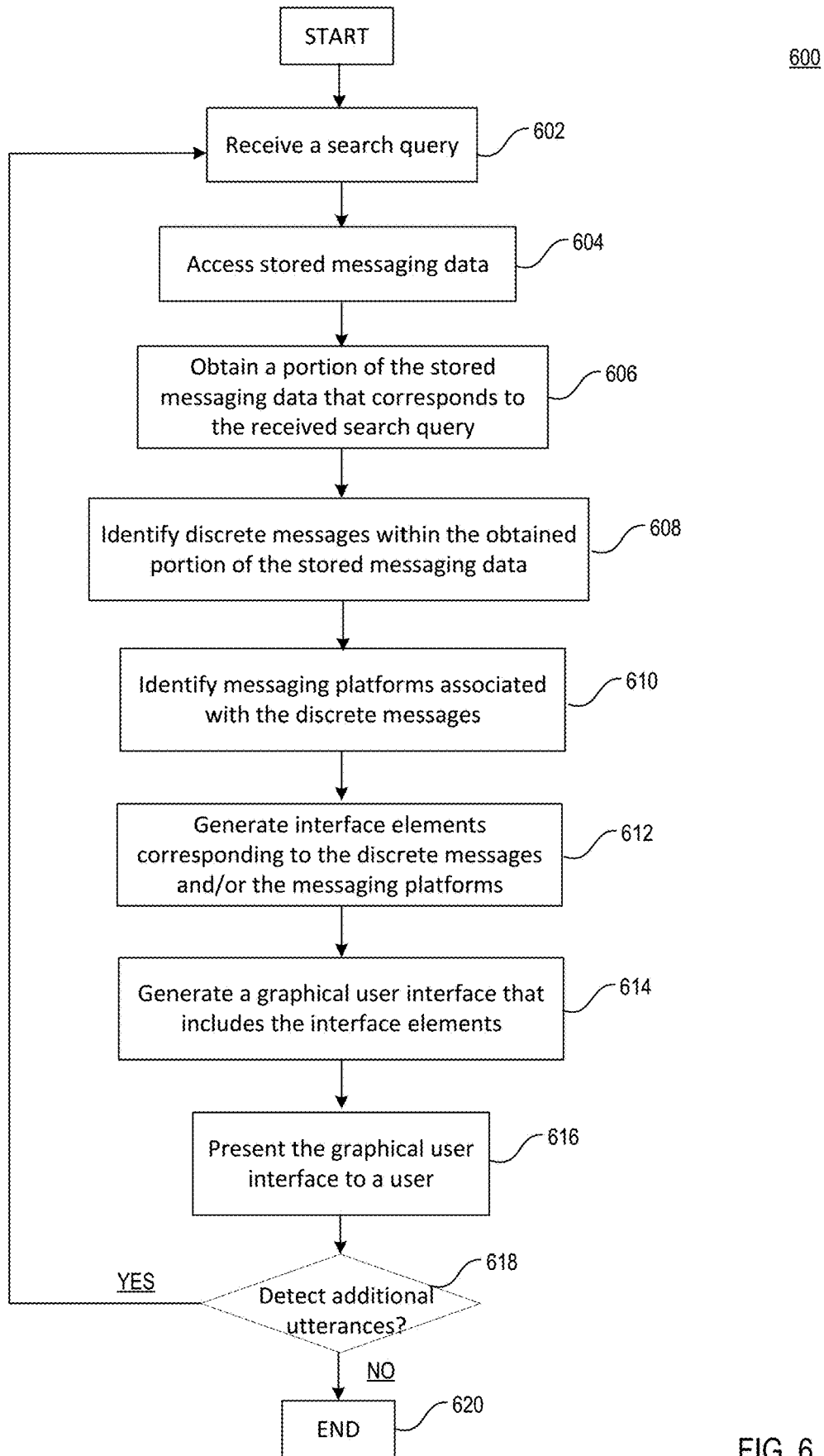
FIG. 6 is a flowchart of exemplary processes for searching stored cross-platform messages in response to a single user query, consistent with the disclosed embodiments.

FIG. 6 is a flowchart of an exemplary process 600 for cross-platform searching of generated messages in response to a single user query, in accordance with the disclosed embodiments. In certain aspects, a communications device (e.g., communications device 110) may perform the steps of exemplary process 600, which may enable communications device 110 to generate terms and/or criteria of a search query based on user 101's spoken utterances, identify multiple cross-platform messages based on the generated terms and/or criteria, and present a single interface that enables user 101 to interact with identified messages generated by multiple messaging platforms.

As described above, communications device 110 may provide functionality that enables user 101 generate and receive messages using a number of different messaging platforms, including, but not limited to, various email applications, instant messaging applications, SMS- and/or MMS-based text messaging, social-networking applications, and other communications platforms that facilitate text-, voice-, or video-based communications between one or more individuals. In certain aspects, communications device 110 (and additionally or alternatively, other computing systems connected to communications device 110 across a communications network) may store data identifying portions of these generated, transmitted and/or received messages. The stored data, e.g., message data, may include structured data stored in a format consistent with the native messaging platforms and/or metadata characterizing the transmitted and/or received messages. In some aspects, communications device 110 may provide operations that, in response to a user-specified query, parse locally stored and/or remotely accessible message data to identify one or more messages generated across the various messaging platform (e.g., cross-platform messages) that are consistent with the user-specified query.

By way of example, in step 602, communication device 110 receive the user-specified query, which may specify various search terms and search criteria, and which may corresponding to a request by user 101 to access and interact with various cross-platform messages that are consistent with the specified search terms and search criteria. The specified search terms and/or search criteria may include, but are not limited to, a request to identity cross-platform messages associated with a particular sender and/or receiver, a particular messaging platform, a presence of words or phrases within corresponding message subjects or message bodies, and/or a particular range of transmission and/or receipt dates. In other instances, the search query may be open-ended and, for example, may request access to all cross-platform messages transmitted from or received by communications device 110 during a particular time period.

In certain aspects, communications device 110 may receive the search query based on one or more utterances spoken by user 101 and captured by an audio interface of communications device 110, such as a microphone. For example, user 101 may activate the audio interface, and may utter one or more phrases that, collectively, establish the user-specified query and user specified search terms and/or criteria. The audio interface may detect the spoken words and phrases (e.g., utterance 102), and may capture audio data that includes the spoken words and phrases. In some aspects, and using any of the exemplary processes described above, communications device 110 (e.g., using speech recognition module 112) may process the captured audio data and generate corresponding textual output data, which may include the user-specified search terms and/or criteria.

Further, communications device 110 may access one or more repositories of stored cross-platform message data (e.g., in step 604), and based on the user-specified search terms and/or criteria, may obtain at least a portion of the stored cross-platform message data that corresponds to the received search query (e.g., in step 606). By way of example, communications device 110 may store data associated with one or more cross-platform messages transmitted from or received by communications device within a locally accessible data repository (e.g., cross-platform message storage 116 of FIG. 1). In certain aspects, in steps 604 and 606, communications device 110 may perform operations (e.g., via search engine 114 of FIG. 1) that access cross-platform message storage 116, identify one or more of the stored cross-platform messages based on the user-specified search terms and/or criteria, and obtain portions of the message data that describe the one or more identified cross-platform messages.

In other aspects, additional cross-platform message data may be stored remotely in computing systems connected to communications device 110 across a corresponding communications network, such as computing system 130. For example, computing system 130 be maintained by or associated with one or more of the multiple messaging platforms (e.g., cloud-based storage associated with or maintained by the messaging platforms), and in step 604 and 606, communications device 110 may perform additional operations that access computing system 130, identify additional stored cross-platform messages based on the user-specified search terms and/or criteria, and obtain portions of the stored message data that describe these additional cross-platform messages.

Communications device 110 may, in certain aspects, perform operations (e.g., using interface generating module 118) that identify a number of cross-platform messages described within the obtained messaging data (e.g., in step 608) and further, that identify the messaging platforms associated with these cross-platform messages (e.g., in step 610). In some instances, the obtained message data may include structured data records that, for each of the identified cross-platform messages, specify a message direction (e.g., transmitted or received by communications device 110), a sender, a recipient, a timestamp associated with transmission or receipt, and/or a messaging platform that facilitated the transmission or receipt. The obtained message data may also include metadata associated with the one or more of the cross-platform messages, and certain instances, portions of the identified cross-platform messages, such as the message subjects and message bodies (e.g., when an operating system of communications device 110 is capable of accessing and indexing corresponding ones of the multiple messaging platforms. Further, using any of the exemplary processes described above, communications device 110 may generate one or more interface elements that describe corresponding ones of the cross-platform message, and additionally or alternatively, summarize groups of cross-platform messages generated by corresponding ones of the messaging platforms (e.g., in step 612).

For example, in step 612, communications device 110 may generate message-specific interface elements (e.g., message cards) that identify and characterize the contents of corresponding ones of the cross-platform messages using any of the exemplary processes described above. Message cards consistent with the disclosed embodiments may include, for example, data identifying corresponding senders, an avatar or image associated with the sender, data identifying the recipient (e.g., user 101), and/or an icon or image associated with the messaging platform. Additionally, in some instances, the generated message cards may include textual, image, video, and/or other multimedia data included within the bodies of corresponding ones of the cross-platform message. Further, in some aspects, when a body of a cross-platform message exceeds a predetermine size (e.g., a number of characters exceeds a predetermined limit, a number of lines of text exceeds the predetermined limit, a number of words exceeds the predetermined limit, etc.), communications device 110 (e.g., using interface generating module 118) may perform operations that truncate the message body and include only a portion of the message body within a corresponding message card, as described above.

In additional instances, and using any of the exemplary processes described above, communications device 110 (e.g., using interface generating module 118) may also perform operations that merge together multiple message cards and generate a single interface element (e.g., a "merged" message card) that represents each of the multiple message cards. For example, communications device 110 may merge together multiple message cards when the communications device 110 received or transmitted the cross-platform messages represented by these message cards within a predetermined time period.

Further, and using any of the exemplary processes described above, communications device 110 may generate one or more platform-specific interface elements, e.g., digest cards, that include textual and/or graphical content characterizing multiple messages received by or transmitted from communications device 110 using corresponding ones of the messaging platforms. For example, each of the digest cards may be associated with a particular messaging platform, and may include content that summarizes groups of the identified cross-platform messages that were generated, transmitted, or received using the particular messaging platform. The disclosed embodiments are, however, not limited to digest cards that include platform-specific interface elements. In additional implementations, one or more of the device cards may include interface elements representative of cross-platform messages associated with, among other things, common senders, common recipients, and common ranges of transmission dates or receipt dates.

In an embodiment, communication device 110 may selectively generate message cards and digest cards in step 612 based on the number of identified cross-platform messages that are consistent with the user-specified search terms and/or criteria. For example, and using any of the exemplary processes described above, communications device 110 may establish that user 101 is capable of readily viewing a threshold number of distinct message cards within presentation device 120 of communications device 110, and may determine whether the number of discrete cross-platform messages within the obtained message data exceeds the established threshold number (e.g., as identified in step 308). When the number of cross-platform messages falls below the established threshold number, communications device 110 may elect to generate message cards for each of cross-platform messages using any of the exemplary processes described above. Alternatively, if communications device 110 were to determine that the number of cross-platform messages exceeds the established threshold number, communications device 110 may elect to generate one or more digest cards that include textual and graphical content summarizing groups of the cross-platform messages associated with corresponding ones of the messaging platforms.

In some aspects, communications device 110 may generate a unified interface that includes the one or more generated interface elements, which include, but are not limited to, one or more of the message cards, merged message cards, and/or digest cards (e.g., in step 614). For example, and in addition to data specifying the content included within each of the message cards, merged message cards, and/or digest cards and a layout of the content within the each of the message cards, merged message cards, and/or digest cards, communications device 110 may also generate data describing a layout and arrangement of the generated interface elements within the unified interface, dimensions of the generated interface elements within the unified interface, and/or shapes of the generated interface elements within the unified interface. Communications device 110 may process the generated data and render the unified interface, and the constituent interface elements, for presentation to user 101 through a corresponding presentation device, such as a touchscreen display of communication device 110 (e.g., in step 616).

Furthermore, and as described above, user 101 may utter words or phrases that specify additional search terms and/or criteria to limit the previous search query. For example, and using any of the processes described above, communications device 110 may present, to user 101, an unified interface that identifies multiple cross-platform messages received by communications device 110 during the last thirty minutes. Upon review of these cross-platform messages, user 101 may utter an additional search query that requests messages received within the last thirty minutes that are associated with a particular sender, with a particular messaging platform, or include specified words or phrases.

In some aspects, communications device 110 may determine whether the audio interface (e.g., the microphone) detect an additional search query uttered by user 101 (e.g., in step 618). If communications device 110 were to determine that the audio interface captured audio data specifying additional search terms and/or criteria (e.g., step 618; YES), exemplary process 600 may pass back to step 612, and communications device 110 may establish the additional search terms and/or criteria based on user 101's spoken utterances, identify additional or alternate cross-platform messages based on the generated terms, and generate, via a presentation device, a single interface that enables user 101 to interact with additional or alternate messages using any of the exemplary processes described above.

Alternatively, if communications device 110 fails to detect any additional utterances (e.g., step 618; NO), then exemplary process 600 is complete in step 620.

In certain implementations, and as described above, communications device 110 may identify one or more cross-platform messages that correspond to a generated search query, and may generate interface elements, e.g., interface elements 122E, for presentation to user 101 through a graphical user interface, e.g., using presentation device 120. The disclosed embodiments are, however, not limited to graphical representations of portion of the identified cross-platform references, and in other implementations, communications device 110 may provide a voice-user interface (VUI) that generates and presents to user 101 and allows user 101 to interact with the presented representations through an ongoing, non-linear dialogue.

For instance, and using any of the exemplary processes described above, communications device 110 may identify one or more cross-platform messages that are consistent with a user-specified search query. In certain implementations, interface generating module 118, and additionally or alternatively, a text-to-speech module or a speech generation module (not shown in FIG. 1) may generate an aural representation of the identified cross-platform messages, and communications device 110 may present the aural representation to user 101 through the speaker or other interface. By way of the example, the presented aural representation may "read" the contents of the identified cross-platform messages to user 110, and in response to the presented aural representation, speech recognition module 112 may detect additional utterances indicative of user 101's interaction with presented cross-platform messages. For example, and as described above, these additional utterances may represent a follow-up to a prior utterance (e.g., "read the next one from Bob"), a request to filter the messages included within search results 112C or message data 122D (e.g., "read me messages received today'), and/or a request to perform a specific operation on one or more of the identified cross-platform messages (e.g., "reply to the second one"), and communications device 110 may perform any of the exemplary processes described above to perform operations consistent with the additional detected utterances.

In other aspects, and as part of the ongoing, non-linear dialog, communications device 110 may perform operations that generate, e.g., using the TTS module, and present to user 101 through the audio interface additional aural content associated with one or more expected user responses. For example, the additional aural content may include a specific question (e.g., requesting clarification regarding a requested cross-platform message associated with similarly named senders) associated with an answer having expected content and/or an expected format. If an additional utterance detected and processed by communications device 110 lacks that expected value or format, communications device 110 may generate and present to user 110 follow-up aural content that poses a variation of the question and/or includes additional context. In certain aspects, and using any of the exemplary processes described above, communications device 110 may repeatedly generate and present to user 110 aural content that poses the question, with additional or alternate variations and/or content, in an attempt to elicit an utterance having the expected content or format, Additionally, in certain implementations described above, communications device 110 may perform operations that, responsive to a user's query, search messaging data generated across multiple messaging platforms and present one or more cross-platform messages that are consistent with the search query to a user via a graphical user interface (GUI) or a voice-user interface (VUI). In other implementations, certain functions performed by communications device 110, including certain functions of speech recognition module 112, search engine 114, interface generating module 118, the text-to-speech (TTS) module, and/or the speech generation module, may be performed by other communications devices connected to communications device 110 across the network, and additionally or alternatively, by other cloud-based computing systems and servers. Further, in other implementations, data identifying one or more of the cross-platform messages generated by, transmitted from, and received by communications device 110 may be stored in one or more remote data repositories accessible to communications device 110 across the network, such as cloud-based repositories and repositories associated with the messaging platforms.

Figure 7:
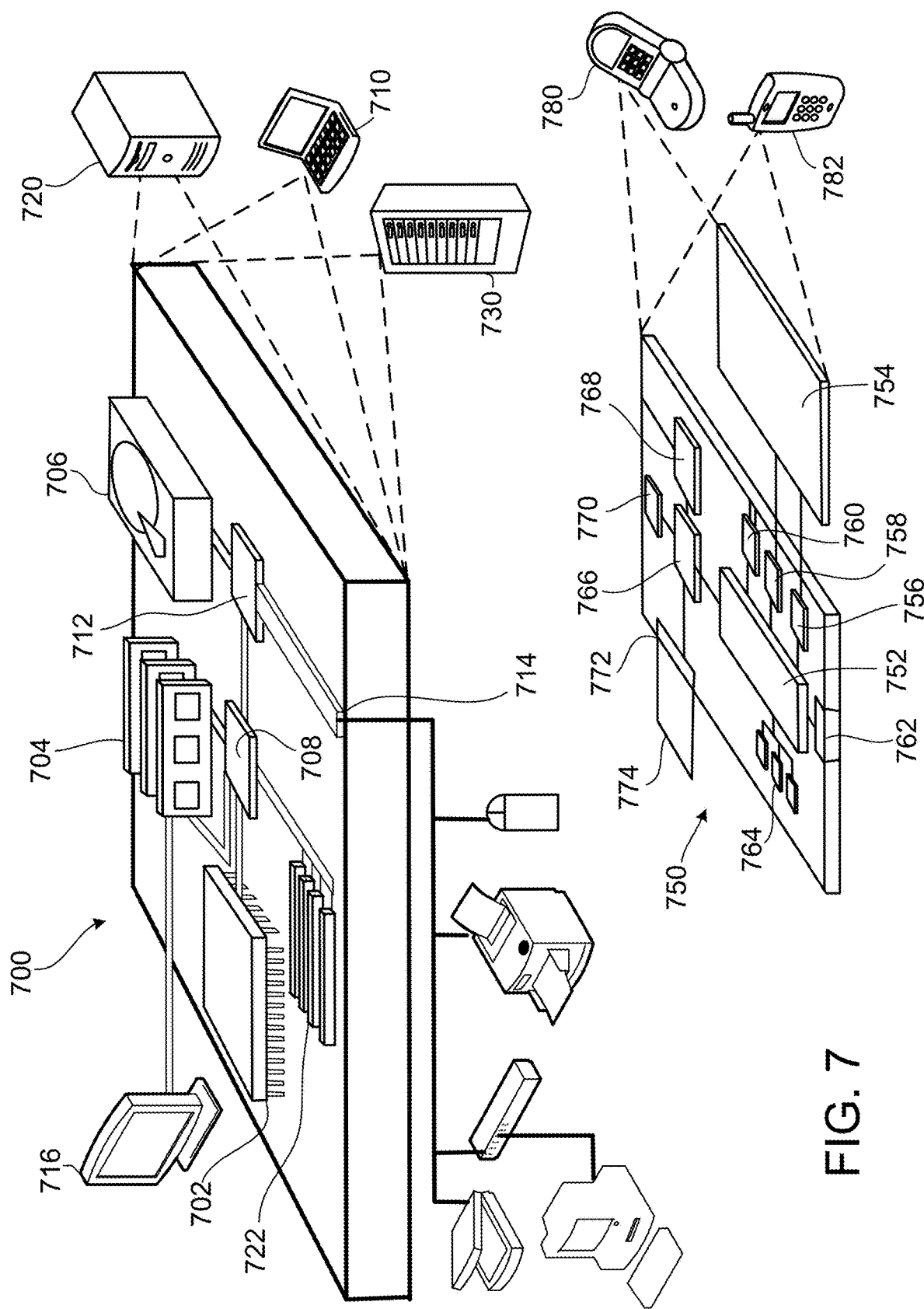
FIG. 7 is a diagram of computing devices that may be used to implement the systems and methods described in this document, as either a client or as a server or plurality of server.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers (e.g., computing system 130 of FIG. 1). Computing device 750 is intended to represent various forms of mobile devices, such as personal digital assistants, cellular telephones, smartphones, and other similar computing devices (e.g., communications device 110 of FIG. 1). Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, microphone/speaker pair, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 524. In addition, it may be implemented in a personal computer such as a laptop computer 722.

Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 702 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

For instances in which the systems and/or methods discussed here may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer-implemented method, comprising:
   receiving, by one or more processors, a query at a communications device;
   obtaining, by the one or more processors, message data responsive to the received query, the message data comprising a plurality of messages, the plurality of messages including messages respectively sent through different messaging platforms;
   identifying, by the one or more processors and from among the plurality of messages, multiple first messages that were each sent through a first messaging platform;
   determining, by the one or more processors, that a count of the identified first messages satisfies a threshold for a minimum number of messages, wherein the threshold is greater than one;
   in response to the determination that the count of the identified first messages satisfies the threshold, generating, by the one or more processors, a summary of the first messages sent through the first messaging platform, wherein the summary includes at least a portion of each of multiple of the first messages that were each sent through the first messaging platform; and
   in response to receiving the query, providing, by the one or more processors, the summary to at least one of a display device or an audio interface for presentation to a user.

2. The method of claim 1, wherein:
   the method further comprises receiving the first messages at the client device;

the message data further comprises temporal data indicative of at least one of a time or date at which the communications device received each of the first messages; and the method includes generating a first interface element that includes the summary, comprising:
establishing a chronological ordering of the received first messages based on the temporal data; and
arranging portions of the first messages within the first interface element in accordance with the established chronological ordering.

3. The method of claim 2, wherein:
the portions of the first messages comprise at least one of textual content or image data; and
the first interface element further comprises a portion of the temporal data associated with an initial one of the first messages within the chronological ordering.

4. The method of claim 1, further comprising:
presenting the summary in a first interface element of a user interface;
detecting a user input associated with the presented first interface element;
in response to the detected input, generating second interface elements associated with each of the first messages, the second interface elements comprising portions of corresponding ones of the first messages;
modifying at least a portion of the user interface to include the second interface elements; and
providing the modified user interface to the display device for presentation to the user.

5. The method of claim 1, wherein generating the summary comprises generating a digest card, the digest card providing a summary of the first messages.

6. The method of claim 1, further comprising:
generating a first interface element of a user interface, wherein the first interface element includes the summary;
identifying, from among the plurality of messages, second messages from a second messaging platform;
determining that a count of the second messages fails to satisfy the threshold; and
in response to determining that the count of the second messages fails to satisfy the threshold, generating a second interface element for each of the second messages, wherein each of the second interface elements comprises at least a portion of a different message of the second messages.

7. The method of claim 1, further comprising:
generating, for a user interface, a first interface element including the summary; and
generating, for the user interface, a second interface element that includes at least a portion of a second message of the plurality of messages.

8. The method of claim 7, wherein:
the query comprises at least one keyword;
the portion of the second message comprises textual content that includes the keyword; and
the method further comprises modifying, within the second interface element, at least one visual characteristic of the textual content that includes the keyword.

9. The method of claim 7, wherein:
the generated user interface includes the second interface element; and
the method further comprises:
detecting a user input associated with the second interface element; and
in response to the detected input, at least one of (i) executing an application program associated with the messaging platform corresponding to the message indicated by the second interface element or (ii) performing operations that initiate an assistant flow.

10. The method of claim 1, further comprising:
determining that a body of a second one of the messages exceeds a predetermined size; and
in response to the determination, generating an interface element, different from the summary, that includes a portion of the body of the second message.

11. The method of claim 1, wherein:
the summary is included in a first interface element of a user interface;
the method further comprises generating a plurality of second interface elements for the user interface, the second interface elements being associated with corresponding second messages of the plurality of messages;
the message data further comprises temporal data indicative of at least one of a time or date for each of the corresponding second messages; and
the method further includes:
establishing a chronological ordering of the second messages based on the temporal data; and
arranging the second interface elements within the user interface in accordance with the established chronological ordering.

12. The method of claim 1, further comprising:
receiving audio data at the communications device, the audio data comprising an utterance spoken by a user into a microphone of the communications device; and
generating the query based on at least a portion of the received audio data.

13. The method of claim 1, further comprising:
transmitting at least a portion of the received query to a computing system across a communications network; and
receiving at least a portion of the message data from the computing system in response to the transmission.

14. The method of claim 1, wherein at least two of the plurality of messages are selected from a different one of the group consisting of: email, instant messaging, SMS/MMS text messaging, social networking application, and chat-based application.

15. The method of claim 1, wherein the plurality of messaging platforms comprise two or more from the group consisting of an email platform, a social-networking platform, a text messaging platform, an instant messaging platform, a text-based chat platform, a voice-based chat platform, and a video-based chat platform.

16. The method of claim 1, further comprising generating, by the one or more processors, a user interface that includes multiple sections, wherein each section corresponds with a single messaging platform and a first section of the multiple sections includes the summary.

17. The method of claim 1, wherein:
each of multiple of the first messages are messages sent by different users through the first messaging platform, and
the first messaging platform is an email platform, a social-networking platform, a text messaging platform, an instant messaging platform, a text-based chat platform, a voice-based chat platform, or a video-based chat platform.

18. A communications device, comprising:
at least one processor; and a memory storing executable instructions that, when executed by the at least one processor, causes the at least one processor to perform operations comprising:
receiving a query;
obtaining message data responsive to the received query, the message data comprising a plurality of messages, the plurality of messages including messages respectively sent through different messaging platforms;
identifying, among the plurality of messages, multiple first messages that were each sent through a first messaging platform; and
determining that a count of the identified first messages satisfies a threshold for a minimum number of messages, wherein the threshold is greater than one;
in response to the determination that the count of the identified first messages satisfies the threshold, generating a summary of the first messages sent through the first messaging platform, wherein the summary includes at least a portion of each of multiple of the first messages that were each sent through the first messaging platform; and
in response to receiving the query, providing the summary to at least one of a display device or an audio interface for presentation to a user.

19. The communications device of claim 18, wherein:
the operations further comprise receiving the first messages at the client device;
the message data further comprises temporal data indicative of at least one of a time or date for each of the first messages; and
the operations further comprise:
establishing a chronological ordering of the received first messages based on the temporal data; and
arranging portions of the first messages in the summary in accordance with the established chronological ordering.

20. The communications device of claim 18, wherein the operations further comprise:
presenting the summary in a first interface element of a user interface;
detecting a user input associated with the presented first interface element;
in response to the detected input, generating second interface elements associated with each of the first messages, the second interface elements comprising portions of corresponding ones of the first messages;
modifying at least a portion of the user interface to include the second interface elements; and
providing the modified user interface to the display device for presentation to the user.

21. The communications device of claim 18, wherein the operations further comprise:
generating a first interface element of a user interface, wherein the first interface element includes the summary;
identifying, from among the plurality of messages, second messages from a second messaging platform;
determining that a count of the second messages fails to satisfy the threshold; and
in response to determining that the count of the second messages fails to satisfy the threshold, generating second interface elements associated with each of the second messages, wherein each of the second interface elements comprises at least a portion of a different message of the second messages.

22. The communications device of claim 18, wherein at least two of the plurality of messages are from different communication platforms of the group consisting of: email, instant messaging, SMS/MMS text messaging, a social networking application, and a chat-based application.

23. One or more tangible, non-transitory computer-readable media storing instructions that, when executed by at least one processor of a client device, cause the client device to perform operations comprising:
receiving a query at a communications device;
obtaining message data responsive to the received query, the message data comprising a plurality of messages, the plurality of messages including messages respectively sent through different messaging platforms;
identifying, from among the plurality of messages, multiple first messages that were each sent through a first messaging platform;
determining that a count of the identified first messages satisfies a threshold for a minimum number of messages, wherein the threshold is greater than one;
in response to the determination that the count of the identified first messages satisfies the threshold, generating a summary of the first messages sent through the first messaging platform, wherein the summary includes at least a portion of each of multiple of the first messages that were each sent through the first messaging platform;
in response to receiving the query, providing the summary to at least one of a display device or an audio interface for presentation to a user.

* * * * *